United States Patent
Kwon et al.

(10) Patent No.: US 10,547,192 B2
(45) Date of Patent: *Jan. 28, 2020

(54) WIRELESS POWER TRANSMITTER, WIRELESS POWER RECEIVER, AND CONTROL METHODS THEREOF

(71) Applicant: Samsung Electronics Co., Ltd., Gyeonggi-do (KR)

(72) Inventors: Hyuk-Choon Kwon, Seoul (KR); Nam-Yun Kim, Seoul (KR); Hee-Won Jung, Gyeonggi-do (KR); Soo-Yeon Jung, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/129,345

(22) Filed: Sep. 12, 2018

(65) Prior Publication Data

US 2019/0027941 A1   Jan. 24, 2019

Related U.S. Application Data

(63) Continuation of application No. 15/643,184, filed on Jul. 6, 2017, now Pat. No. 10,090,697, which is a
(Continued)

(30) Foreign Application Priority Data

Mar. 22, 2013   (KR) .................. 10-2013-0031180
May 3, 2013   (KR) .................. 10-2013-0050128
(Continued)

(51) Int. Cl.
*H02J 7/00*   (2006.01)
*H02J 50/40*   (2016.01)
(Continued)

(52) U.S. Cl.
CPC .............. *H02J 7/007* (2013.01); *H02J 50/12* (2016.02); *H02J 50/40* (2016.02); *H02J 50/80* (2016.02)

(58) Field of Classification Search
CPC .. H02J 7/007; H02J 50/40; H02J 50/12; H02J 50/80; H02J 7/025
(Continued)

(56) References Cited

U.S. PATENT DOCUMENTS 8,099,140 B2   1/2012   Arai
9,306,636 B2   4/2016   Kwon
(Continued)

FOREIGN PATENT DOCUMENTS

CA   2 836 391   11/2012
CN   102165667   8/2011
(Continued)

OTHER PUBLICATIONS

Chinese Office Action dated Mar. 1, 2017 issued in counterpart application No. 201480017570.X, 17 pages.
(Continued)

*Primary Examiner* — Sun J Lin
(74) *Attorney, Agent, or Firm* — The Farrell Law Firm, P.C.

(57) ABSTRACT

A wireless power transmitter configured to transmit power to a wireless power receiver and a method for controlling the wireless power transmitted are provided. The method includes applying a detection power for detecting a change in a load impedance of the wireless power transmitter; detecting the change in the load impedance of the wireless power transmitter; receiving, from a wireless power receiver, a first signal within a preset time period after detecting the change, wherein the first signal includes a field for a load impedance detection; determining whether the
(Continued)

detected change corresponds to the field of the first signal; determining whether a reception intensity of the first signal is greater than a threshold; and based on a determination that the detected change corresponds to the field of the first signal and the reception intensity of the first signal is greater than the threshold, transmitting, to the wireless power receiver, a second signal to form a communication connection with the wireless power receiver.

10 Claims, 24 Drawing Sheets

Related U.S. Application Data continuation of application No. 14/223,147, filed on Mar. 24, 2014, now Pat. No. 9,722,446.

(30) Foreign Application Priority Data

May 9, 2013 (KR) .......................... 10-2013-0052761
May 10, 2013 (KR) .......................... 10-2013-0053450

(51) Int. Cl.
*H02J 50/12* (2016.01)
*H02J 7/02* (2016.01)
*H02J 50/80* (2016.01)

(58) Field of Classification Search
USPC ........................................................ 320/108
See application file for complete search history.

(56) References Cited

U.S. PATENT DOCUMENTS

| | | | |
|---|---|---|---|
| 9,722,446 | B2 | 8/2017 | Kwon et al. |
| 10,090,697 | B2 * | 10/2018 | Kwon et al. ............ H02J 7/007 |
| 2011/0169446 | A1 | 7/2011 | Kondo |
| 2011/0193520 | A1 | 8/2011 | Yamazaki et al. |
| 2012/0043827 | A1 | 2/2012 | Baarman |
| 2012/0139356 | A1 | 6/2012 | Jung et al. |
| 2012/0286727 | A1 | 11/2012 | Kim et al. |
| 2012/0299389 | A1 | 11/2012 | Lee et al. |
| 2013/0043735 | A1 | 2/2013 | Low et al. |
| 2013/0058379 | A1 | 3/2013 | Kim et al. |
| 2013/0063082 | A1 | 3/2013 | Lee et al. |
| 2014/0062395 | A1 | 3/2014 | Kwon |

FOREIGN PATENT DOCUMENTS

| | | |
|---|---|---|
| EP | 2 568 572 | 3/2013 |
| EP | 2 874 276 | 5/2015 |
| KR | 1020120132225 | 12/2012 |
| KR | 1020130028011 | 3/2013 |
| WO | WO 2012/157969 | 11/2012 |

OTHER PUBLICATIONS

European Search Report dated Jan. 7, 2015 issued in counterpart application No. 14161045.1-1806, 5 pages.
European Search Report dated Jan. 22, 2016 issued in counterpart application No. 15180250.1-1804, 6 pages.
Korean Decision of Grant dated Jun. 3, 2019 issued in counterpart application No. 10-2013-0053450, 6 pages.

* cited by examiner

WIRELESS POWER TRANSMITTER, WIRELESS POWER RECEIVER, AND CONTROL METHODS THEREOF

PRIORITY

This application is a Continuation Application of U.S. patent application Ser. No. 15/643,184, which was filed in the U.S. Patent and Trademark Office on Jul. 6, 2017, which is a Continuation Application of U.S. patent application Ser. No. 14/223,147, which was filed in the U.S. Patent and Trademark Office on Mar. 24, 2014, issued as U.S. Pat. No. 9,722,446 on Aug. 1, 2017, and claims priority under 35 U.S.C. § 119(a) to Korean Patent Application Serial Nos. 10-2013-0031180, 10-2013-0050128, 10-2013-0052761, and 10-2013-0053450, which were filed in the Korean Intellectual Property Office on Mar. 22, 2013, May 3, 2013, May 9, 2013, and May 10, 2013, respectively, the entire content of each of which is incorporated herein by reference.

BACKGROUND

1. Field of the Invention

The present invention generally relates to a wireless power transmitter, a wireless power receiver, and control methods thereof, and more particularly, to a wireless power transmitter, a wireless power receiver, and control methods thereof, which can wirelessly transmit/receive charging power.

2. Description of the Related Art

Mobile terminals such as a mobile phone, a Personal Digital Assistant (PDA) and the like are driven by rechargeable batteries, and the battery of the mobile terminal is charged through supplied electronic energy by using a separate charging apparatus. In general, separate contact terminals are arranged outside of the charging apparatus and the battery, and the charging apparatus and the battery are electrically connected to each other through contact between the contact terminals.

However, since the contact terminals outwardly protrude in such a contact type charging scheme, the contact terminals are easily contaminated by rogue substances and thus the battery charging may not be correctly performed. Further, the battery charging may also not be correctly performed in a case where the contact terminal is exposed to moisture.

Recently, a wireless charging or a non-contact charging technology has been developed and used for electronic devices to solve the above-mentioned problem.

Such a wireless charging technology employs wireless power transmission/reception, and corresponds to, for example, a system in which a battery can be automatically charged if the battery is laid on a charging pad without the need of connecting the mobile phone to a separate charging connector. In general, electronic products are wirelessly charged through the wireless charging technology, and the portability of electronic devices can be increased since there is no need to provide a wired charging apparatus. Therefore, technologies related to the wireless charging technology are expected to be significantly developed in the coming age of electric cars.

The wireless charging technology largely includes an electromagnetic induction scheme using a coil, a resonance scheme using a resonance, and an RF/microwave radiation scheme converting electrical energy to microwaves and then transmitting the microwaves.

It is considered up to now that the electromagnetic induction scheme is mainstream, but it is expected all electronic products will be wirelessly charged, anytime and anywhere, without a wire in the near future on the strength of recent successful experiments for wirelessly transmitting power to a destination spaced away by dozens of meters through the use of microwaves.

A power transmission method through electromagnetic induction corresponds to a scheme of transmitting electric power between a first coil and a second coil. When a magnet is moved in a coil, an induction current occurs. By using the induction current, a magnetic field is generated at a transferring end, and electric current is induced according to a change of the magnetic field so as to create energy at a reception end. This phenomenon is referred to as magnetic induction, and the electric power transmission method using magnetic induction has a high energy transmission efficiency.

With respect to the resonance scheme, electricity is wirelessly transferred using an electric power transmission principle of the resonance scheme based on a coupled mode theory even if a device to be charged is separated from a charging device by several meters. A wireless charging system employs a concept in physics that resonance is the tendency in which when a tuning fork oscillates at a particular frequency, a wine glass next to the tuning fork oscillates at the same frequency. Similarly, an electromagnetic wave containing electrical energy can be made to resonate, and resonated electrical energy is directly transferred only when there is a receiving device having the resonance frequency present. The remaining electrical energy which is not used is reabsorbed into an electromagnetic field instead of being spread in the air, so that the electrical energy does not affect surrounding machines or people, unlike other electromagnetic waves.

Meanwhile, research on a wireless charging method is currently being conducted, but standards for a wireless charging order, a search for a wireless power transmitting unit/receiving unit, selection of a communication frequency between the wireless power transmitting unit/receiving unit, a wireless power control, selection of a matching circuit, and communication time distribution to each wireless power receiving unit in one charging cycle, and the like, have not yet been proposed. Particularly, there is a need for a standard for a configuration and a procedure in which the wireless power receiving unit selects the wireless power transmitting unit to receive wireless power.

Specifically, there is a need to develop a technology which, when the wireless power transmitting unit has a communication connection with a wireless power receiving unit arranged outside of a charging range, excludes the corresponding wireless power receiving unit.

SUMMARY

The present invention has been made to solve the above problems and disadvantages, and to provide at least the advantages described below.

Accordingly, an aspect of the present invention provides a wireless power transmitting unit and a control method thereof which determine a wireless power receiving unit forming a cross-connection and exclude the determined wireless power receiving unit. Another aspect of the present invention provides a wireless power receiving unit and a control method thereof in which a wireless power transmitting unit determines a wireless power receiving unit forming a cross-connection.

In accordance with an aspect of the present invention, a method is provided for controlling a wireless power transmitter. The method includes applying a detection power for detecting a change in a load impedance of the wireless power transmitter; detecting the change in the load impedance of the wireless power transmitter; receiving, from a wireless power receiver, a first signal within a preset time after detecting the change, wherein the first signal includes a field for a load impedance detection; determining whether the detected change corresponds to the field of the first signal; determining whether a reception intensity of the first signal is greater than a threshold; and based on a determination that the detected change corresponds to the field of the first signal and the reception intensity of the first signal is greater than the threshold, transmitting, to the wireless power receiver, a second signal to form a communication connection with the wireless power receiver.

In accordance with another aspect of the present invention, a wireless power transmitter is provided for transmitting power to a wireless power receiver. The wireless power transmitter includes a resonator; a controller configured to control a power supply to apply, to the resonator, a detection power for detecting a change in a load impedance of the wireless power transmitter, and detect the change in the load impedance of the wireless power transmitter; and a wireless communication unit configured to receive a first signal within a preset time after detecting the change. The first signal includes a field for a load impedance detection. The controller is further configured to determine whether the detected change corresponds to the field of the first signal, determine whether a reception intensity of the first signal is greater than a threshold, and based on a determination that the detected change corresponds to the field of the first signal and the reception intensity of the first signal is greater than the threshold, transmit, to the wireless power receiver, a second signal to form a communication connection with the wireless power receiver by using the wireless communication unit.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Figure 1:
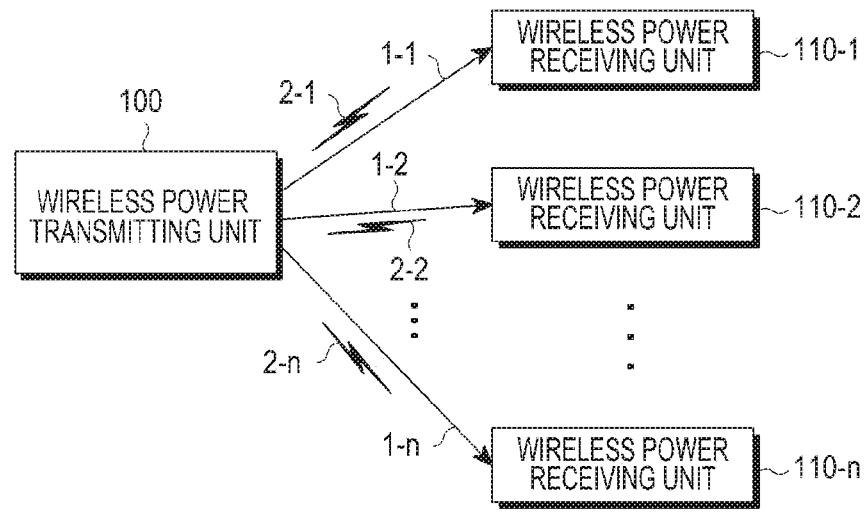
FIG. 1 illustrates a concept for describing overall operations of a wireless charging system.

Hereinafter, various embodiments of the present invention will be described in detail with reference to the accompanying drawings. It should be noted that the same components of the drawings are designated by the same reference numeral throughout the figures. In the following description of the present invention, a detailed description of known functions and configurations incorporated herein will be omitted when it may make the subject matter of the present disclosure unclear.

FIG. 1 illustrates a concept describing general operations of a wireless charging system. As illustrated in FIG. 1, the wireless charging system includes a wireless power transmitting unit 100 and one or more wireless power receiving units 110-1, 110-2, . . . , and 110-n.

The wireless power transmitting unit 100 wirelessly transmits power 1-1, 1-2, . . . , and 1-n to the one or more wireless power receiving units 110-1, 110-2, . . . , and 110-n, respectively. More specifically, the wireless power transmitting unit 100 may wirelessly transmit power 1-1, 1-2, . . . , and 1-n to only wireless power receiving units which have been authenticated through a predetermined authentication procedure.

The wireless power transmitting unit 100 forms an electrical connection with the wireless power receiving units 110-1, 110-2, . . . , and 110-n. For example, the wireless power transmitting unit 100 transmits wireless power in an electromagnetic wave form to the wireless power receiving units 110-1, 110-2, . . . , and 110-n.

Meanwhile, the wireless power transmitting unit 100 may perform bidirectional communication with the wireless power receiving units 110-1, 110-2, . . . , and 110-n. The wireless power transmitting unit 100 and the wireless power receiving units 110-1, 110-2, . . . , and 110-n may process or transmit packets 2-1, 2-2, . . . , and 2-n including predetermined frames. The frames will be described below in more detail. Particularly, the wireless power receiving units may be a mobile communication terminal, a PDA, a PMP, a smart phone, and the like.

The wireless power transmitting unit 100 wirelessly provides electric power to a plurality of wireless power receiving units 110-1, 110-2, . . . , and 110-n. For example, the wireless power transmitting unit 100 transmits electric power to the one or more wireless power receiving units 110-1, 110-2, . . . , and 110-n through a resonance scheme. When the wireless power transmitting unit 100 adopts the resonance scheme, it is preferable that a distance between the wireless power transmitting unit 100 and the one or more wireless power receiving units 110-1, 110-2, . . . , and 110-n is less than or equal to m. Further, when the wireless power transmitting unit 100 adopts the electromagnetic induction scheme, it is preferable that a distance between the wireless power transmitting unit 100 and the plurality of wireless power receiving units 110-1, 110-2, . . . , and 110-n is less than or equal to 10 cm.

The wireless power receiving units 110-1, 110-2, . . . , and 110-n receive wireless power from the wireless power transmitting unit 100 to charge batteries therein. Further, the wireless power receiving units 110-1,110, -2,110-2, . . . , and 110-n transmit a signal for requesting wireless power transmission, information required for wireless power reception, state information of the wireless power receiving unit, or control information of the wireless power transmitting unit 100 to the wireless power transmitting unit 100. Information on the transmitted signal will be described below in more detail.

Further, the wireless power receiving units 110-1, 110-2, . . . , and 110-n may transmit a message indicating a charging state of each of the wireless power receiving units 110-1, 110-2, . . . , and 110-n to the wireless power transmitting unit 100.

The wireless power transmitting unit 100 may include a display means such as a display, and displays a state of each of the wireless power receiving units 110-1, 110-2, and 110-n based on the message received from each of the wireless power receiving units 110-1, 110-2, . . . , and 110-n. Further, the wireless power transmitting unit 100 may also display a time expected to be spent until each of the wireless power receiving units 110-1, 110-2, . . . , and 110-n is completely charged.

The wireless power transmitting unit 100 may transmit a control signal for disabling a wireless charging function to each of the wireless power receiving units 110-1, 110-2, . . . , and 110-n. The wireless power receiving units having received the disabled control signal of the wireless charging function from the wireless power transmitting unit 100 disable the wireless charging function.

Figure 2:
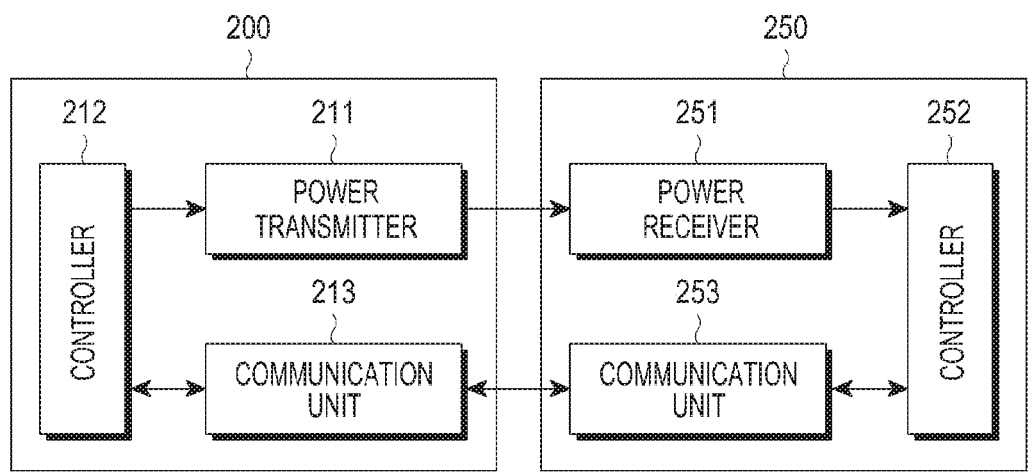
FIG. 2 is a block diagram of a wireless power transmitting unit and a wireless power receiving unit according to an embodiment of the present invention.

FIG. 2 is a block diagram illustrating a wireless power transmitting unit and a wireless power receiving unit according to an embodiment of the present invention.

As illustrated in FIG. 2, the wireless power transmitting unit 200 includes a power transmitter 211, a controller 212 and a communication unit 213. Further, the wireless power receiving unit 250 includes a power receiver 251, a controller 252 and a communication unit 253.

The power transmitter 211 supplies power which is required by the wireless power transmitting unit 200, and wirelessly provides power to the wireless power receiving unit 250. Here, the power transmitter 211 may provide the power in a form of alternate current (AC) waves, and also may convert direct current (DC) waves into the AC waves by using an inverter while providing the power in a form of DC waves, so as to provide the power in the form of AC waves. The power transmitter 211 may be implemented in a form of an embedded battery or in a form of a power receiving interface so as to receive the power from outside thereof and supply the power to the other components. It will be easily understood by those skilled in the art that the power transmitter 211 is not limited as long as it can supply power of constant AC waves.

In addition, the power transmitter 211 may supply the AC waves to the wireless power receiving unit 250 in a form of electromagnetic waves. The power transmitter 211 may further include a resonant circuit, resulting in transmission or reception of predetermined electromagnetic waves. When the power transmitter 211 is implemented by the resonant circuit, inductance L of a loop coil of the resonant circuit may be changed. It will be easily understood by those skilled in the art that the power transmitter 211 is not limited as long as it can transmit and receive the electromagnetic waves.

The controller 212 controls overall operations of the wireless power transmitting unit 200. The controller 212 may control overall operations of the wireless power transmitting unit 200 by using an algorithm, a program, or an application which is required for a control and read from a storage unit (not shown). The controller 212 may be implemented in a form of a CPU, a microprocessor, a mini computer and the like. Operation of the controller 212 will be described below in detail.

The communication unit 213 communicates with the wireless power receiving unit 250 in a specific manner. The communication unit 213 communicates with a communication unit 253 of the wireless power receiving unit 250 by using, for example, a Near Field Communication (NFC) scheme, a Zigbee communication scheme, an infrared ray communication scheme, a visible ray communication scheme, a Bluetooth communication scheme, a Bluetooth Low Energy (BLE) scheme and the like. In addition, the communication unit 213 may use a CSMA/CA algorithm. Meanwhile, the above mentioned communication schemes are only examples, and the scope of the present invention is not limited by a specific communication scheme which is performed by the communication unit 213.

Furthermore, the communication unit 213 may transmit a signal for providing information of the wireless power transmitting unit 200. Here, the communication unit 213 may unicast, multicast, or broadcast the signal. Table 1 shows a data structure of a signal transmitted from the wireless power transmitting unit 200 according to an embodiment of the present invention. The wireless power transmitting unit 200 may transmit a signal having the following frame on every preset period, and the signal may be referred to as a notice signal hereinafter.

TABLE 1

| frame type | protocol version | sequence number | network ID | RX to Report (schedule mask) | Reserved | Number of Rx |
|---|---|---|---|---|---|---|
| Notice | 4 bit | 1 Byte | 1 Byte | 1 Byte | 5 bit | 3 bit |

A frame type in Table 1 refers to a field indicating a type of signal, and indicates that a corresponding signal is a notice signal. A protocol version field is a field indicating a type of protocol of a communication scheme and may be allocated, for example, 4 bits. A sequence number field is a field indicating a sequential order of the corresponding signal and may be allocated, for example, 1 byte. For example, the sequence number may increase by one for each signal transmission/reception step. A network ID field is a field indicating a network ID of the wireless power transmitting unit 200 and may be allocated, for example, 1 byte. An Rx to Report (schedule mask) field is a field indicating wireless power receiving units for providing a report to the wireless power transmitting unit 200 and may be allocated, for example, 1 byte. Table 2 shows the Rx to Report (schedule mask) field according to an embodiment of the present invention.

TABLE 2

| Rx to Report (schedule mask) | | | | | | | |
|---|---|---|---|---|---|---|---|
| Rx1 | Rx2 | Rx3 | Rx4 | Rx5 | Rx6 | Rx7 | Rx8 |
| 1 | 0 | 0 | 0 | 0 | 1 | 1 | 1 |

In Table 2, Rx1 to Rx8 may correspond to first to eighth wireless power receiving units (PRU #1~PRU #8). The Rx to Report (schedule mask) field may be implemented such that the wireless power receiving unit having a schedule mask number of 1 provides a report, whereas the wireless power receiving unit having a schedule mask number of 0 does not provide a report.

A reserved field is a field reserved for being used in the future and may be allocated, for example, 5 bytes. A number of Rx field is a field indicating a number of wireless power receiving units located near the wireless power transmitting unit 200 and may be allocated, for example, 3 bits.

The communication unit 213 receives power information from the wireless power receiving unit 250. Here, the power information may include at least one of a capacity of the wireless power receiving unit 250, a residual battery amount, a number of times of charges, an amount of use, a battery capacity, and a proportion of the battery.

Further, the communication unit 213 may transmit a signal of controlling a charging function in order to control the charging function of the wireless power receiving unit 250. The signal of controlling the charging function is a control signal of controlling the wireless power receiver 251 of the specific wireless power receiving unit 250 so as to enable or disable the charging function. More specifically, the power information may include information on an insertion of a wireless charging terminal, a transition from a Stand Alone (SA) mode to a Non Stand Alone (NSA) mode, error state release and the like.

The communication unit 213 may receive a signal from another wireless power transmitting unit (not shown) as well as the wireless power receiving unit 250. For example, the communication unit 213 may receive a notice signal of the frame in the above mentioned Table 1 from another wireless power transmitting unit.

Meanwhile, in FIG. 2, it is shown that the power transmitter 211 and the communication unit 213 are configured as different hardware and the wireless power transmitting unit 200 communicates in an out-band manner, but this is only an example. In the present invention, the power transmitter 211 and the communication unit 213 may be implemented as a single hardware device so that the wireless power transmitting unit 200 performs communication in an in-band manner.

The wireless power transmitting unit 200 and the wireless power receiving unit 250 transmit and receive various signals. Accordingly, the wireless power receiving unit 250 enters a wireless power network which is managed by the wireless power transmitting unit 200 and performs a charging process through wireless power transmission and reception. The above mentioned process will be described below in more detail.

Figure 3:
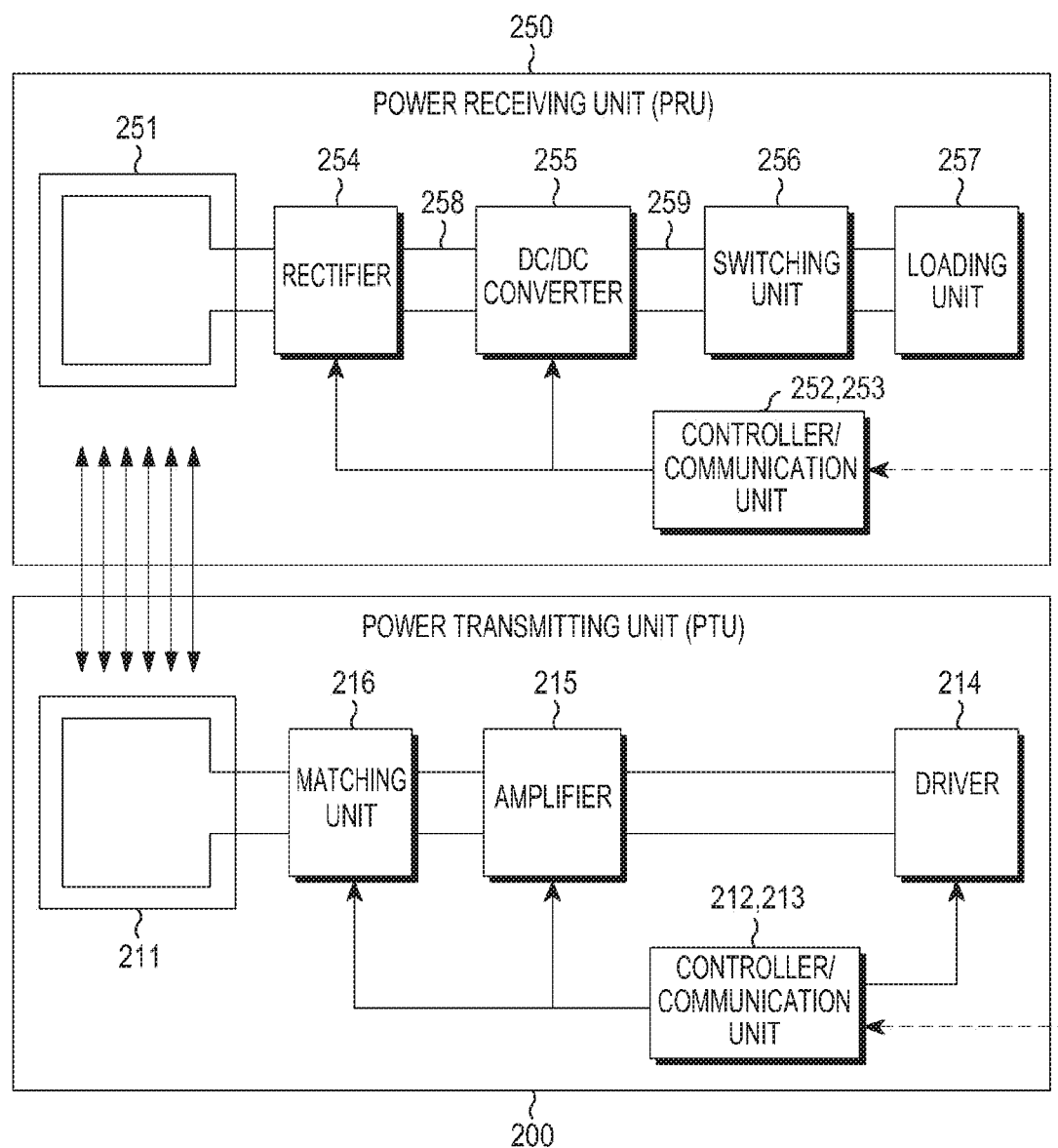
FIG. 3 is a block diagram illustrating in detail a wireless power transmitting unit and a wireless power receiving unit according to an embodiment of the present invention.

FIG. 3 is a block diagram illustrating in detail the wireless power transmitting unit and the wireless power receiving unit according to the embodiment of the present invention.

As illustrated in FIG. 3, the wireless power transmitting unit 200 includes the power transmitter 211, the controller/communication unit (or MCU & Out-of-band Signaling unit) 212/213, a driver (or power supply unit) 214, an amplifier 215, and a matching unit 216. The wireless power receiving unit 250 includes the power receiver 251, the controller/communication unit (or MCU & Out-of-band Signaling unit) 252/253, a rectifier 254, a DC/DC converter 255, a switching unit 256, and a loading unit 257.

The driver 214 outputs DC power having a preset voltage value. The voltage value of the DC power output by the driver 214 may be controlled by the controller/communication unit 212/213.

The DC power output from the driver 214 is output to the amplifier 215. The amplifier 215 amplifies the DC power by a preset gain. Further, the amplifier 215 converts DC power to AC power based on a signal input from the controller/communication unit 212/213. Accordingly, the amplifier 215 outputs AC power to the matching unit 216.

The matching unit 216 performs impedance matching. For example, the matching unit 216 adjusts impedance viewed from the matching unit 316 to control output power to be high efficiency or high output power. The matching unit 216 adjusts impedance based on a control of the controller/communication unit 212/213. The matching unit 216 may include at least one of a coil and a capacitor. The controller/communication unit 212/213 controls a connection state with at least one of the coil and the capacitor, and accordingly, performs impedance matching.

The power transmitter 211 transmits input AC power to the power receiver 251. The power transmitter 211 and the power receiver 251 may be implemented by resonant circuits having the same resonance frequency. For example, the resonance frequency may be determined as 6.78 MHz.

Meanwhile, the controller/communication unit 212/213 communicates with the controller/communication unit 252/253 of the wireless power receiving unit 350, and performs communication, for example, with a bi-directional 2.4 GHz frequency.

The power receiver 251 receives charging power.

The rectifier 254 rectifies wireless power received by the power receiver 251 in the form of DC power, and may be implemented in a form of bridge diode. The DC/DC converter 255 converts the rectified current into a predetermined gain. For example, the DC/DC converter 255 converts the rectified electric current so that a voltage of an output end 259 becomes 5V. Meanwhile, a minimum value and a maximum value of the voltage which can be applied may be preset for a front end 258 of the DC/DC converter 255.

The switching unit 256 connects the DC/DC converter 255 and the loading unit 257. The switching unit 256 maintains an on/off state under a control of the controller 252. When the switching unit 256 is in the on state, the loading unit 257 stores converted power which is input from the DC/DC converter 255.

Figure 4:
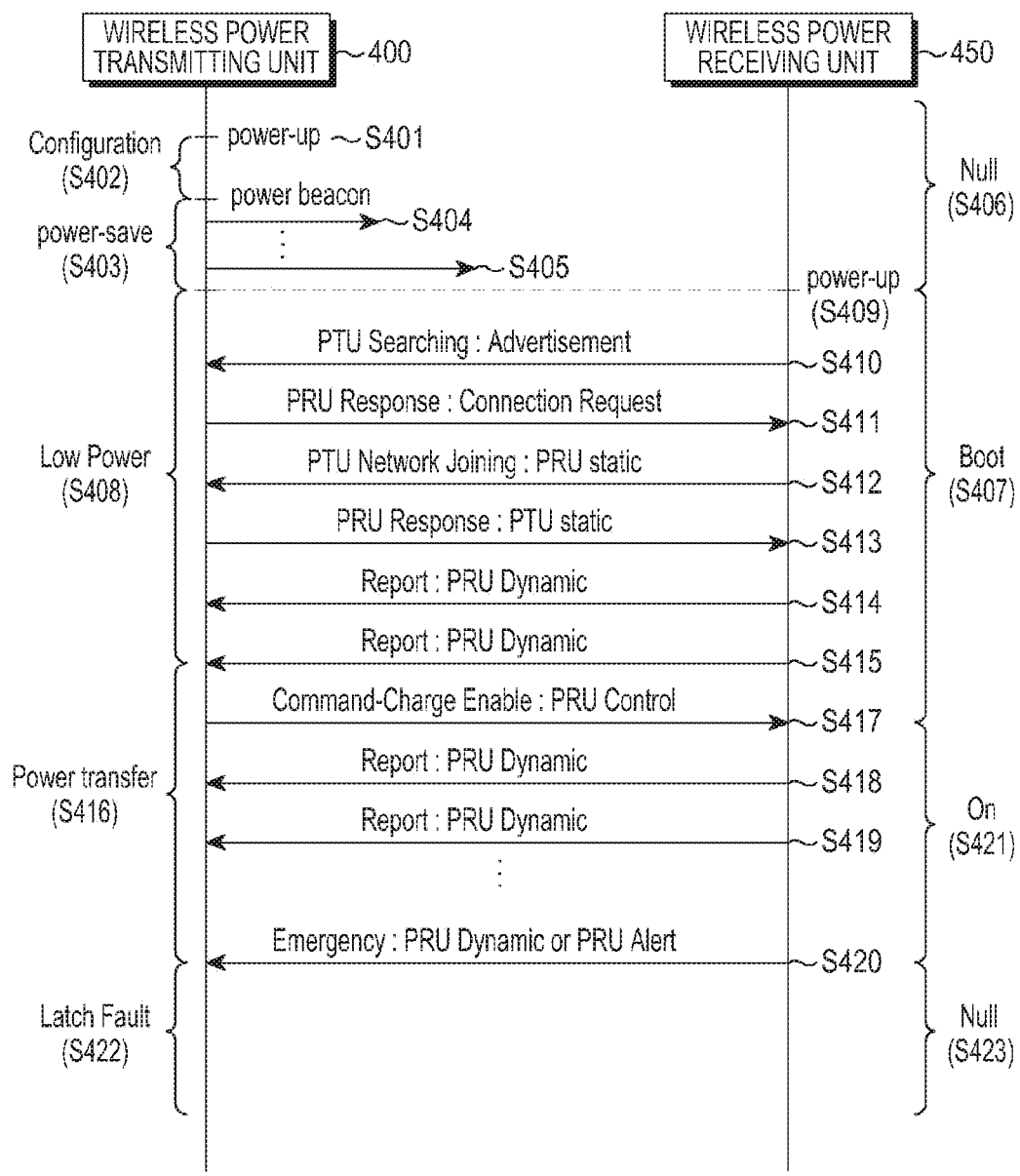
FIG. 4 is a flow diagram illustrating operations of a wireless power transmitting unit and a wireless power receiving unit according to an embodiment of the present invention.

FIG. 4 is a flow diagram illustrating operations of the wireless power transmitting unit and the wireless power receiving unit according to an embodiment of the present invention. As illustrated in FIG. 4, a wireless power transmitting unit 400 applies power in step S401. When the power is applied, the wireless power transmitting unit 400 configures an environment in S402.

The wireless power transmitting unit 400 enters a power saving mode in step S403. In the power saving mode, the wireless power transmitting unit 400 may apply different types of power beacons for detection according to their own periods, which will be described in more detail with reference to FIG. 6. For example, in FIG. 4, the wireless power transmitting unit 400 may apply detection power beacons in steps S404 and S405 and sizes of power values of the detection power beacons may be different. A part or all of the detection power beacons of steps S404 and S405 may have power enough power to drive the communication unit of the wireless power receiving unit 450. For example, the wireless power receiving unit 450 may drive the communication unit by the part or all of the detection power beacons of steps S404 and S405 to communicate with the wireless power transmitting unit 400. The above state is referred to as a null state in step S406.

The wireless power transmitting unit 400 detects a load change by an arrangement of the wireless power receiving unit 450. The wireless power transmitting unit 400 enters a low power mode in step S409. The low power mode will be described in more detail with reference to FIG. 6. Meanwhile, the wireless power receiving unit 450 drives the communication unit based on power received from the wireless power transmitting unit 400 in step S409.

The wireless power receiving unit 450 transmits a Power Transmitting Unit (PTU) searching signal to the wireless power transmitting unit 400 in step S410. The wireless power receiving unit 450 may transmit the PTU searching signal as an advertisement signal based on BLE. The wireless power receiving unit 450 may transmit the PTU searching signal periodically or until a preset time arrives and receives a response signal from the wireless power transmitting unit 400.

When receiving the PTU searching signal from the wireless power receiving unit 450, the wireless power transmitting unit 400 transmits a Power Receiving Unit (PRU) response signal in step S411. The PRU response signal results in a connection between the wireless power transmitting unit 400 and the wireless power receiving unit 450.

The wireless power receiving unit 450 transmits a PRU static signal in step S412. The PRU static signal may be a signal indicating a state of the wireless power receiving unit 450 and which requests joining the wireless power network managed by the wireless power transmitting unit 400.

The wireless power transmitting unit 400 transmits a PTU static signal in step S413. The PTU static signal transmitted by the wireless power transmitting unit 400 may be a signal indicating a capability of the wireless power transmitting unit 400.

When the wireless power transmitting unit 400 and the wireless power receiving unit 450 transmit and receive the PRU static signal and the PTU static signal, the wireless power receiving unit 450 periodically transmits a PRU dynamic signal in steps S414 and S415. The PRU dynamic signal includes at least one parameter information measured by the wireless power receiving unit 450. For example, the PRU dynamic signal may include voltage information of a back end of the rectifier of the wireless power receiving unit 450. The state of the wireless power receiving unit 450 is referred to as a boot state in step S407.

The wireless power transmitting unit 400 may enter a power transmission mode in step S416 and transmits a PRU command signal corresponding to a command signal to allow the wireless power receiving unit 450 to be charged in step S417. In the power transmission mode, the wireless power transmitting unit 400 transmits charging power.

The PRU command signal transmitted by the wireless power transmitting unit 400 may include information for enabling/disabling the charging of the wireless power receiving unit 450 and permission information. The PRU command signal may be transmitted when the wireless power transmitting unit 400 changes the state of the wireless power receiving unit 450 or periodically, for example, a period of 250 ms. The wireless power receiving unit 450 may change a configuration according to the PRU command signal and transmit the PRU dynamic signal for reporting the state of the wireless power receiving unit 450 in steps S418 and S419. The PRU dynamic signal transmitted by the wireless power receiving unit 450 includes at least one of information on a voltage, a current, a state of the wireless power receiving unit, and temperature. The state of the wireless power receiving unit 450 is referred to as an on state in step S421.

Meanwhile, the PRU dynamic signal may have a data structure as shown in Table 3 below.

TABLE 3

| Field | octets | description | use | units |
|---|---|---|---|---|
| optional fields | 1 | defines which optional fields are populated | mandatory | |
| Vrect | 2 | voltage at diode output | mandatory | mV |
| Irect | 2 | current at diode output | mandatory | mA |
| Vout | 2 | voltage at charge/battery port | optional | mV |
| Iout | 2 | current at charge/battery port | optional | mA |
| temperature | 1 | temperature of PRU | optional | Deg C from −40 C. |
| Vrect min dyn | 2 | Vrect low limit(dynamic value) | optional | mV |
| Vrect set dyn | 2 | desired Vrect (dynamic value) | optional | mV |
| Vrect high dyn | 2 | Vrect high limit (dynamic value) | optional | mV |
| PRU alert | 1 | warnings | mandatory | Bit field |
| RFU (Reserved for Future Use) | 3 | undefined | | |

The PRU dynamic signal may include at least one of optional field information, voltage information of the back end of the rectifier of the wireless power receiving unit ('Vrect'), current information of the back end of the rectifier of the wireless power receiving unit ('Irect'), voltage information of the back end of the DC/DC converter of the wireless power receiving unit ('Vout'), current information of the back end of the DC/DC converter of the wireless power receiving unit ('Iout'), temperature information ('temperature'), minimum voltage value information of the back end of the rectifier of the wireless power receiving unit ('Vrect min dyn'), optimal voltage value information of the back end of the rectifier of the wireless power receiving unit ('Vrect set dyn'), maximum voltage value information of the back end of the rectifier of the wireless power receiving unit ('Vrect high dyn'), and alert information ('PRU alert') as shown in Table 3.

The alert information ('PRU alert') may have a data structure as shown in Table 4 below.

TABLE 4

| 7 | 6 | 5 | 4 | 3 | 2 | 1 | 0 |
|---|---|---|---|---|---|---|---|
| over voltage | over current | over temperature | charge complete | TA detect | transition | restart request | RFU |

The alert information may include over voltage, over current, over temperature, charge complete, Travel Adapter (TA) detection, SA mode/NSA mode transition, restart request and the like as shown in Table 4.

The wireless power receiving unit 450 receives the PRU command signal to perform the charging. For example, when the wireless power transmitting unit 400 has enough power to charge the wireless power receiving unit 450, the wireless power transmitting unit 400 transmits the PRU command signal for enabling the charging. Meanwhile, the PRU command signal may be transmitted whenever the charging state is changed. The PRU command signal may be transmitted, for example, every 250 ms, or transmitted when a parameter is changed. The PRU command signal may be set to be transmitted within a preset threshold, for example, within one second even though the parameter is not changed.

Meanwhile, the wireless power receiving unit 450 detects the generation of errors. The wireless power receiving unit 450 transmits an alert signal to the wireless power transmitting unit 400 in step S420. The alert signal may be transmitted as the PRU dynamic signal or a PRU alert signal. For example, the wireless power receiving unit 450 may transmit the PRU alert field of Table 3 reflecting an error state to the wireless power transmitting unit 400. Alternatively, the wireless power receiving unit 450 may transmit a single PRU alert signal indicating the error state to the wireless power transmitting unit 400. When receiving the alert signal, the wireless power transmitting unit 400 may enter a latch fault mode in step S422. The wireless power receiving unit 450 may enter a null state in step S423.

Figure 5:
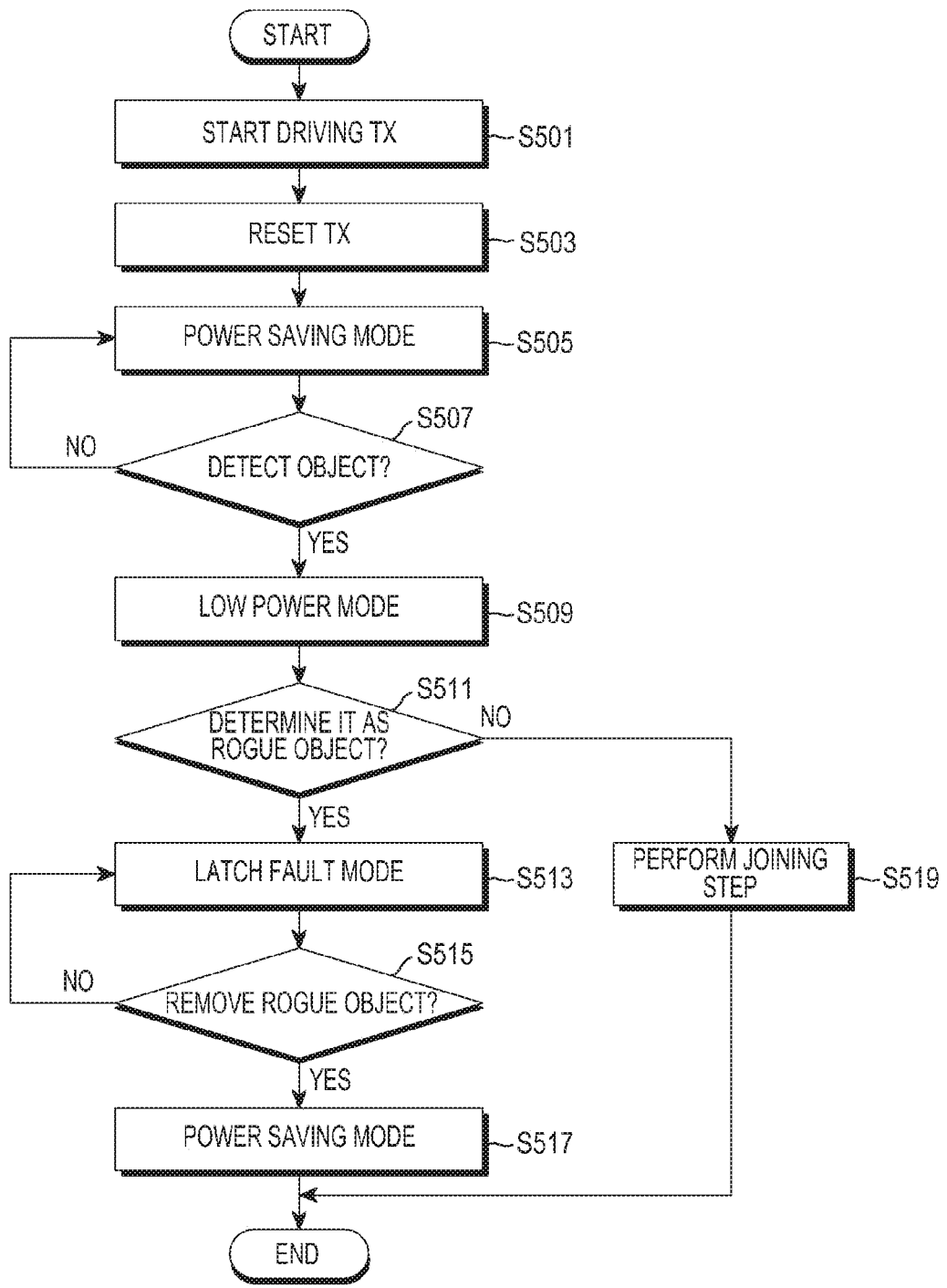
FIG. 5 is a flowchart illustrating operations of the wireless power transmitting unit and the wireless power receiving unit according to another embodiment of the present invention.
Figure 6:
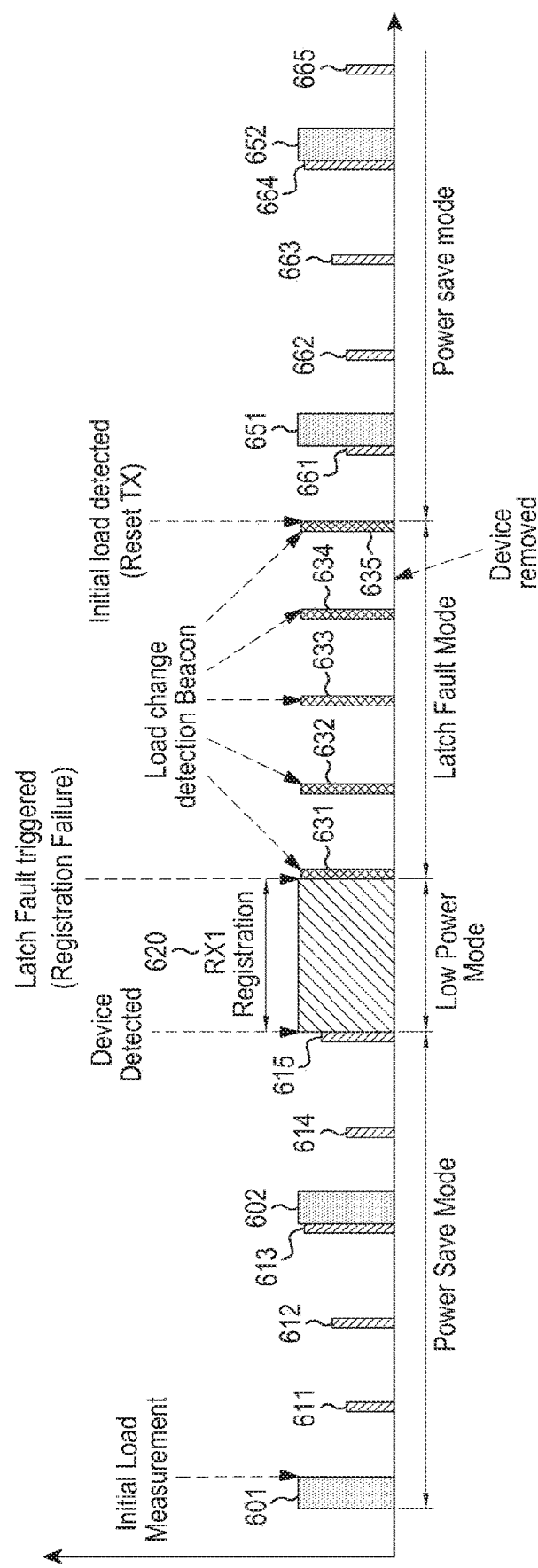
FIG. 6 is a graph on an x axis of an amount of power applied by a wireless power transmitting unit.

FIG. 5 is a flowchart illustrating operations of the wireless power transmitting unit and the wireless power receiving unit according to another embodiment of the present invention. A control method of FIG. 5 will be described in more detail with reference to FIG. 6. FIG. 6 is a graph on an x axis of a power amount applied by the wireless power transmitting unit according to the embodiment of FIG. 5.

As illustrated in FIG. 5, the wireless power transmitting unit initiates the operation in step S501. Further, the wireless power transmitting unit resets an initial configuration in step S503. The wireless power transmitting unit enters a power saving mode in step S505. The power saving mode may correspond to an interval where the wireless power transmitting unit applies power having different amounts to the power transmitter. For example, the power saving mode may correspond to an interval where the wireless power transmitting unit applies second power 601 and 602 and third power 611, 612, 613, 614, and 615 to the power transmitter in FIG. 6. The wireless power transmitting unit may periodically apply the second power 601 and 602 according to a second period. When the wireless power transmitting unit applies the second power 601 and 602, the application continues for a second period. The wireless power transmitting unit may periodically apply the third power 611, 612, 613, 614, and 615 according to a third period. When the wireless power transmitting unit applies the third power 611, 612, 613, 614, and 615, the application continues for the third period. Meanwhile, although it is illustrated that power values of the third power 611, 612, 613, 614, and 615 are different from each other, the power values of the third power 611, 612, 613, 614, and 615 may be different or the same.

For example, the wireless power transmitting unit may output the third power 611 and then output the third power 612 having the same size of the power amount. As described above, when the wireless power transmitting unit outputs the third power having the same size, the power amount of the third power may have a power amount by which a smallest wireless power receiving unit, for example, a wireless power receiving unit of a Category 1 can be detected.

The wireless power transmitting unit may output the third power 611 and then output the third power 612 having a different size of the power amount. As described above, when the wireless power transmitting unit outputs the third power having the different size, the power amount of the third power may be a power amount by which a wireless power receiving unit of a Category 1 to Category 5 can be detected. For example, when the third power 611 has a power amount by which a wireless power receiving unit of Category 5 can be detected, the third power 612 may have a power amount by which a wireless power receiving unit of Category 3 can be detected, and the third power 613 may have a power amount by which a wireless power receiving unit of Category 1 can be detected.

Meanwhile, the second power 601 and 602 may be power which can drive the wireless power receiving unit. More specifically, the second power 601 and 602 may have a power amount which can drive the controller and the communication unit of the wireless power receiving unit.

The wireless power transmitting unit applies the second power 601 and 602 and the third power 611, 612, 613, 614, and 615 to the power receiver according to a second period and a third period, respectively. When the wireless power receiving unit is arranged on the wireless power transmitting unit, impedance viewed from a point of the wireless power transmitting unit may be changed. The wireless power transmitting unit detects a change in the impedance while the second power 601 and 602 and the third power 611, 612, 613, 614, and 615 are applied. For example, the wireless power transmitting unit may detect the change in the impedance while the third power 615 is applied. Accordingly, the wireless power transmitting unit may detect an object instead of the wireless receiving unit in step S507. When the object is not detected in step S507, the wireless power transmitting unit returns to step S505 and maintains a power saving mode in which different power is periodically applied.

Meanwhile, when there is the change in the impedance and thus the object is detected in step S507, the wireless power transmitting unit enters a low power mode in step S509. The low power mode is a mode in which the wireless power transmitting unit applies driving power having a power amount by which the controller and the communication unit of the wireless power receiving unit can be driven. For example, in FIG. 6, the wireless power transmitting unit applies driving power 620 to the power transmitter. The wireless power receiving unit receives the driving power 620 to drive the controller and the communication unit. The wireless power receiving unit performs communication with the wireless power transmitting unit according to a predetermined scheme based on the driving power 620. For example, the wireless power receiving unit may transmit/receive data required for an authentication and join the wireless power network managed by the wireless power transmitting unit based on the data. However, when a rogue object (foreign substance, etc.) is arranged on the wireless power transmitting unit instead of the wireless power receiving unit, the data transmission/reception cannot be performed. Accordingly, the wireless power transmitting unit determines whether the arranged object is the rogue object (or foreign object) in step S511. For example, when the wireless power transmitting unit does not receive a response from the object within a preset time, the wireless power transmitting unit determines the object to be the rogue object.

When the object is determined to be the rogue object in step S511, the wireless power transmitting unit enters a latch fault mode. When the object is not determined to be the rogue object in step S511, the wireless power transmitting unit performs a joining step in step S519. For example, the wireless power transmitting unit may periodically apply first power 631 to 634 according to a first period in FIG. 6. The wireless power transmitting unit may detect a change in impedance while applying the first power. For example, when the rogue object is removed, an impedance change may be detected and the wireless power transmitting unit may determine that the rogue object has been removed. Alternatively, when the rogue object has not been removed, the wireless power transmitting unit does not detect an impedance change and may determine that the rogue object has not been removed. When the rogue object has not been removed, the wireless power transmitting unit may output at least one of a lamp and a warning sound to inform a user that a state of the wireless power transmitting unit is an error state. Accordingly, the wireless power transmitting unit may include an output unit that outputs at least one of the lamp and the warning sound.

When it is determined that the rogue object has not been removed in step S515, the wireless power transmitting unit returns to step S513 and maintains the latch fault mode. When it is determined that the rogue object has been removed in step S515, the wireless power transmitting unit enters the power saving mode again in step S517. For example, the wireless power transmitting unit applies second power 651 and 652 and third power 661 to 665 of FIG. 6.

As described above, when the rogue object is arranged on the wireless power transmitting unit instead of the wireless power receiving unit, the wireless power transmitting unit enters the latch fault mode. Further, the wireless power transmitting unit determines whether to remove the rogue object by checking for an impedance change based on the power applied in the latch fault mode. That is, a condition of the entrance into the latch fault mode in the embodiment of FIGS. 5 and 6 may be the arrangement of the rogue object on the wireless transmitting unit. Meanwhile, the wireless power transmitting unit may have various latch fault mode entrance conditions as well as the arrangement of the rogue object. For example, the wireless power transmitting unit may be cross-connected with the arranged wireless power receiving unit and may enter the latch fault mode in the above case.

Accordingly, when the cross-connection is generated, the wireless power transmitting unit is required to return to an initial state and the wireless power receiving unit is required to be removed. The wireless power transmitting unit may set the cross-connection by which the wireless power receiving unit arranged on another wireless power transmitting unit joins the wireless power network as the latch fault mode entrance condition. An operation of the wireless power transmitting unit when the error is generated which includes the cross-connection will be described with reference to FIG. 7.

Figure 7:
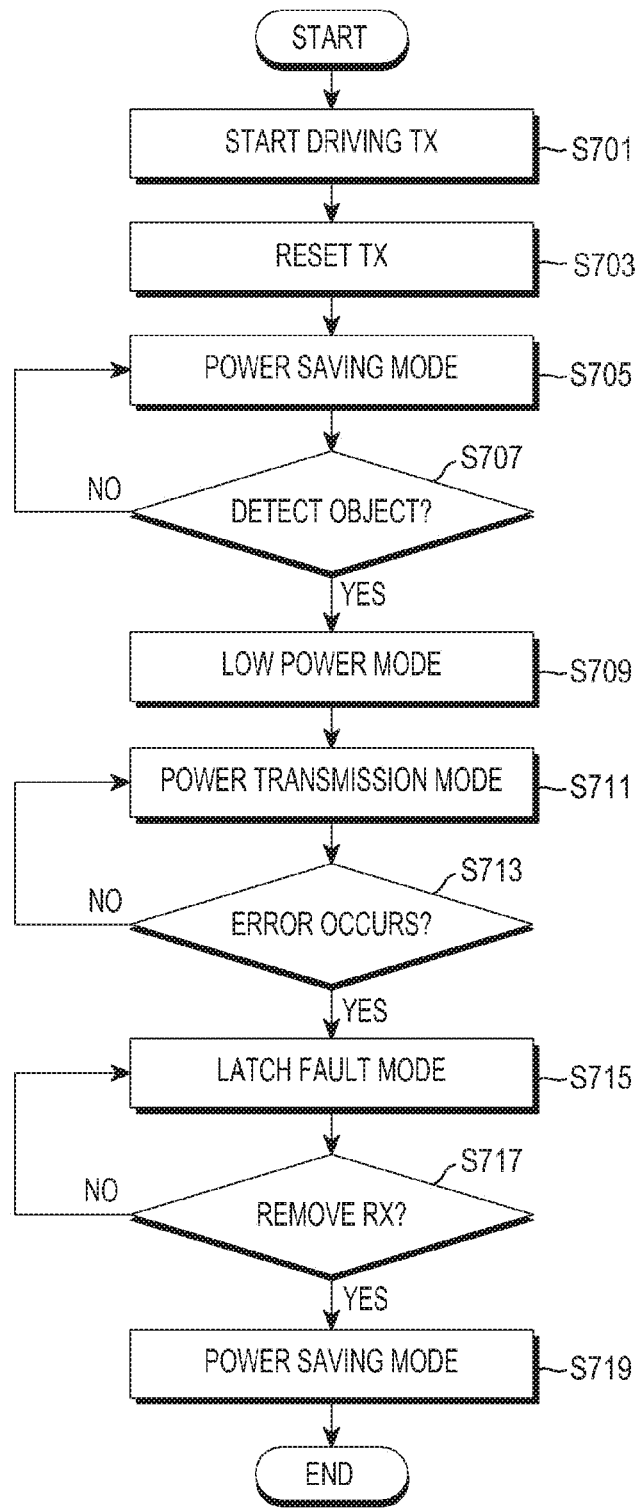
FIG. 7 is a flowchart illustrating a control method of a wireless power transmitting unit according to an embodiment of the present invention.
Figure 8:
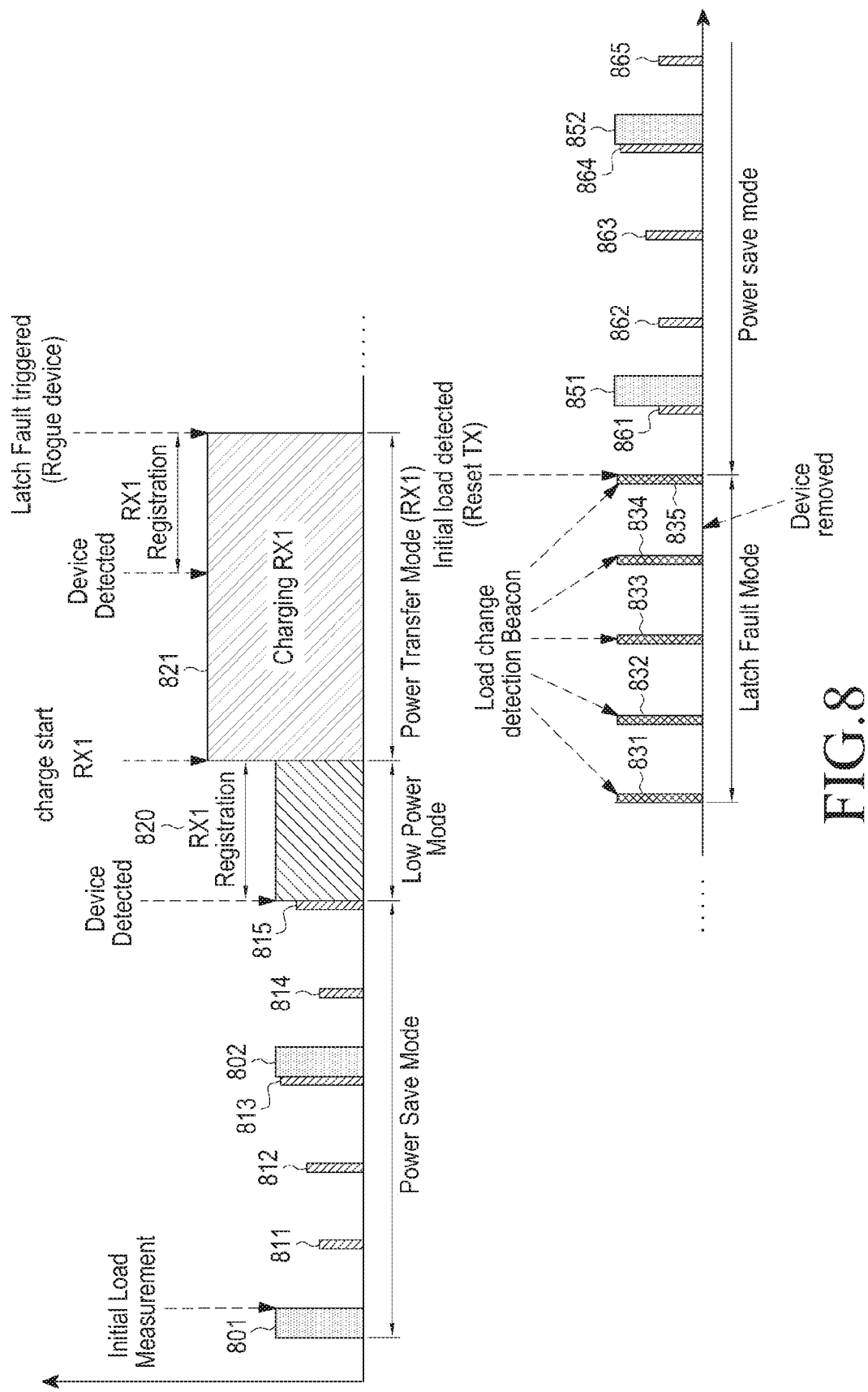
FIG. 8 is a graph on an x axis of an amount of power applied by a wireless power transmitting unit according to the embodiment of FIG. 7.

FIG. 7 is a flowchart illustrating a control method of the wireless power transmitting unit according to an embodiment of the present invention. The control method of FIG. 7 will be described in more detail with reference to FIG. 8. FIG. 8 is a graph on an x axis of a power amount applied by the wireless power transmitting unit according to the embodiment of FIG. 7.

The wireless power transmitting unit initiates the operation in step S701. Further, the wireless power transmitting unit resets an initial configuration in step S703. The wireless power transmitting unit enters the power saving mode again in step S705. The power saving mode may be an interval where the wireless power transmitting unit applies power having different amounts to the power transmitter. For example, the power saving mode may correspond to an interval where the wireless power transmitting unit applies second power 801 and 802 and third power 811, 812, 813, 814, and 815 to the power transmitter in FIG. 8. The wireless power transmitting unit may periodically apply the second power 801 and 802 according to a second period. When the wireless power transmitting unit applies the second power 801 and 802, the application continues for a second period. The wireless power transmitting unit may periodically apply the third power 811, 812, 813, 814, and 815 according to a third period. When the wireless power transmitting unit applies the third power 811, 812, 813, 814, and 815, the application continues for the third period. Meanwhile, although it is illustrated that power values of the third power 811, 812, 813, 814, and 815 are different from each other, the power values of the third power 811, 812, 813, 814, and 815 may be different or the same.

Meanwhile, the second power 801 and 802 may be power which can drive the wireless power receiving unit. More specifically, the second power 601 and 602 may have a power amount which can drive the controller and the communication unit of the wireless power receiving unit.

The wireless power transmitting unit applies the second power 801 and 802 and the third power 811, 812, 813, 814, and 815 to the power receiver according to a second period and a third period, respectively. When the wireless power receiving unit is arranged on the wireless power transmitting unit, impedance viewed from a point of the wireless power transmitting unit may be changed. The wireless power transmitting unit detects the impedance change while the second power 801 and 802 and the third power 811, 812, 813, 814, and 815 are applied. For example, the wireless power transmitting unit may detect the impedance change while the third power 815 is applied. Accordingly, the wireless power transmitting unit may detect an object instead of the wireless power receiving unit in step S707. When the object is not detected in step S707, the wireless power transmitting unit returns to step S705 and maintains the power saving mode in which different power is periodically applied.

Meanwhile, when the impedance is changed and thus the object is detected in step S707, the wireless power transmitting unit enters the low power mode in step S709. The low power mode is a mode in which the wireless power transmitting unit applies driving power having a power amount by which the controller and the communication unit of the wireless power receiving unit can be driven. For example, in FIG. 8, the wireless power transmitting unit applies driving power 820 to the power transmitter. The wireless power receiving unit receives the driving power 820 to drive the controller and the communication unit. The wireless power receiving unit performs communication with the wireless power transmitting unit according to a predetermined scheme based on the driving power 820. For example, the wireless power receiving unit may transmit/receive data required for an authentication and join the wireless power network managed by the wireless power transmitting unit based on the data.

Thereafter, the wireless power transmitting unit enters the power transmission mode in which charging power is transmitted in step S711. For example, the wireless power transmitting unit applies charging power 821 and the charging power is transmitted to the wireless power receiving unit as illustrated in FIG. 8.

The wireless power transmitting unit determines whether an error is generated in the power transmission mode in step S713. The error may be the arrangement of the rogue object on the wireless power transmitting unit, cross-connection, over voltage, over current, over temperature and the like.

The wireless power transmitting unit may include a sensing unit that measures the over voltage, the over current, the over temperature and the like. For example, the wireless power transmitting unit measures a voltage or a current at a reference position. When the measured voltage or current is larger than a threshold, it is determined that conditions of the over voltage or the over current are satisfied. Alternatively, the wireless power transmitting unit may include a temperature sensing means and the temperature sensing means measures a temperature at a reference position of the wireless power transmitting unit. When the temperature at the reference position is larger than a threshold, the wireless power transmitting unit determines that a condition of the over temperature is satisfied.

Although it has been illustrated that the error is generated since the rogue object is additionally arranged on the wireless power transmitting unit in this embodiment of FIG. 8, such an error is not limited thereto and it will be easily understood by those skilled in the art that the wireless power transmitting unit operates through a similar process with respect to the arrangement of the rogue object, cross-connection, over voltage, over current, and over temperature.

When the error is not generated in step S713, the wireless power transmitting unit returns to step S711 and maintains the power transmission mode. Meanwhile, when the error is generated in step S713, the wireless power transmitting unit enters the latch fault mode in step S715. For example, the wireless power transmitting unit applies first power 831 to 835 as illustrated in FIG. 8. Further, the wireless power transmitting unit may output an error generation display including at least one of a lamp and a warning sound during the latch fault mode. When it is determined that the rogue object has not been removed in step S717, the wireless power transmitting unit returns to step S715 and maintains the latch fault mode. Meanwhile, when it is determined that the rogue object has been removed in step S717, the wireless power transmitting unit enters the power saving mode again in step S719. For example, the wireless power transmitting unit applies second power 851 and 852 and third power 861 to 865 of FIG. 8.

In the above description, the operation in a case where the error is generated while the wireless power transmitting unit transmits the charging power has been discussed. Hereinafter, an operation in a case where a plurality of wireless power receiving units on the wireless power transmitting unit receive charging power will be described.

Figure 9:
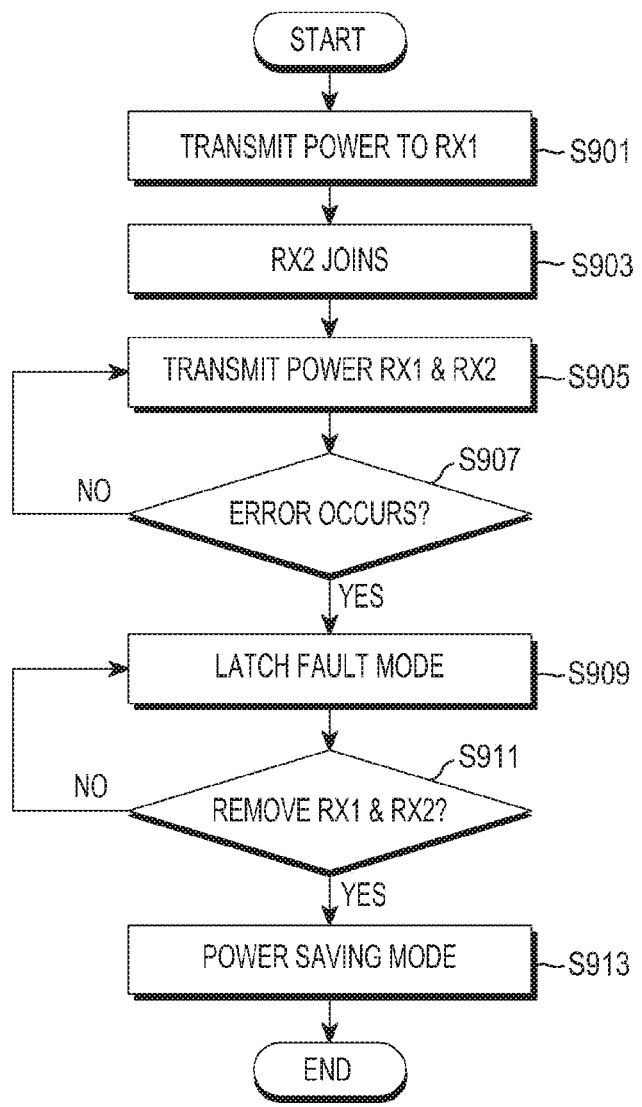
FIG. 9 is a flowchart illustrating a control method of a wireless power transmitting unit according to an embodiment of the present invention.
Figure 10:
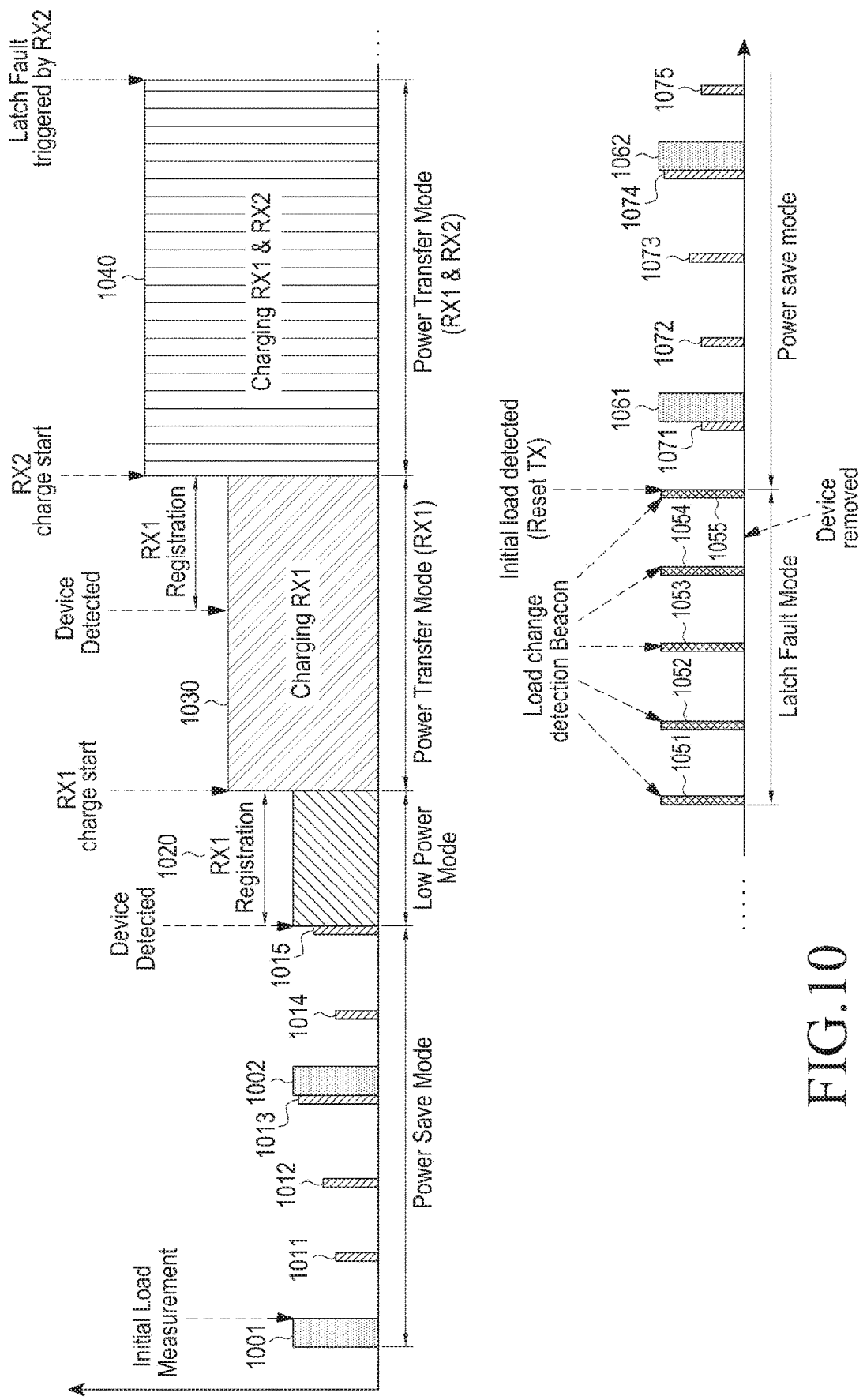
FIG. 10 is a graph on an x axis of an amount of power applied by a wireless power transmitting unit according to the embodiment of FIG. 9.

FIG. 9 is a flowchart illustrating a control method of the wireless power transmitting unit according to an embodiment of the present invention. The control method of FIG. 9 will be described in more detail with reference to FIG. 10. FIG. 10 is a graph on an x axis of a power amount applied by the wireless power transmitting unit according to the embodiment of FIG. 9.

As illustrated in FIG. 9, the wireless power transmitting unit transmits charging power to a first wireless power receiving unit in step S901. Further, the wireless power transmitting unit allows a second wireless power receiving unit to additionally join the wireless power network in step S903. The wireless power transmitting unit transmits charging power to the second wireless power receiving unit in step S905. More specifically, the wireless power transmitting unit applies a sum of the charging power required by the first wireless power receiving unit and the second wireless power receiving unit to the power receiver.

FIG. 10 illustrates an embodiment of steps S901 to S905. For example, the wireless power transmitting unit maintains the power saving mode in which second power 1001 and 1002 and third power 1011 to 1015 are applied. Thereafter, the wireless power transmitting unit detects the first wireless power receiving unit and enters the low power mode in which a detection power 1020 applied to the first wireless power receiving unit to detect is maintained. Next, the wireless power transmitting unit enters the power transmission mode in which first charging power 1030 is applied. The wireless power transmitting unit detects the second wireless power receiving unit and allows the second wireless power receiving unit to join the wireless power network. Further, the wireless power transmitting unit applies second charging power 1040 having a power amount corresponding to a sum of power amounts required by the first wireless power receiving unit and the second wireless power receiving unit.

Referring back to FIG. 9, the wireless power transmitting unit detects error generation in step S907 while charging power is transmitted to both the first and second wireless power receiving units in step S905. As described above, the error may be the arrangement of the rogue object on the wireless power transmitting unit, cross-connection, over voltage, over current, over temperature, and the like. When the error is not generated in step S907, the wireless power transmitting unit returns to step S905 and maintains the application of the second charging power 1040.

Meanwhile, when the error is generated in step S907, the wireless power transmitting unit enters the latch fault mode in step S909. For example, the wireless power transmitting unit applies first power 1051 to 1055 according to a first period in FIG. 10. The wireless power transmitting unit determines whether both the first wireless power receiving unit and the second wireless power receiving unit have been removed in step S911. For example, the wireless power transmitting unit may detect an impedance change while applying the first power 1051 to 1055. The wireless power transmitting unit determines whether both the first wireless power receiving unit and the second wireless power receiving unit have been removed based on whether the impedance is returned to an initial value.

When it is determined that both the first wireless power receiving unit and the second wireless power receiving unit have been removed in step S911, the wireless power receiving unit enters the power saving mode in step S913. For example, the wireless power transmitting unit applies second power 1061 and 1062 and third power 1071 to 1075 according to a second period and a third period, respectively.

As described above, even when the wireless power transmitting unit applies charging power to at least one wireless power receiving unit, the wireless power transmitting unit may determine whether the wireless power receiving unit or the rogue object is easily removed when the error is generated.

Figure 11:
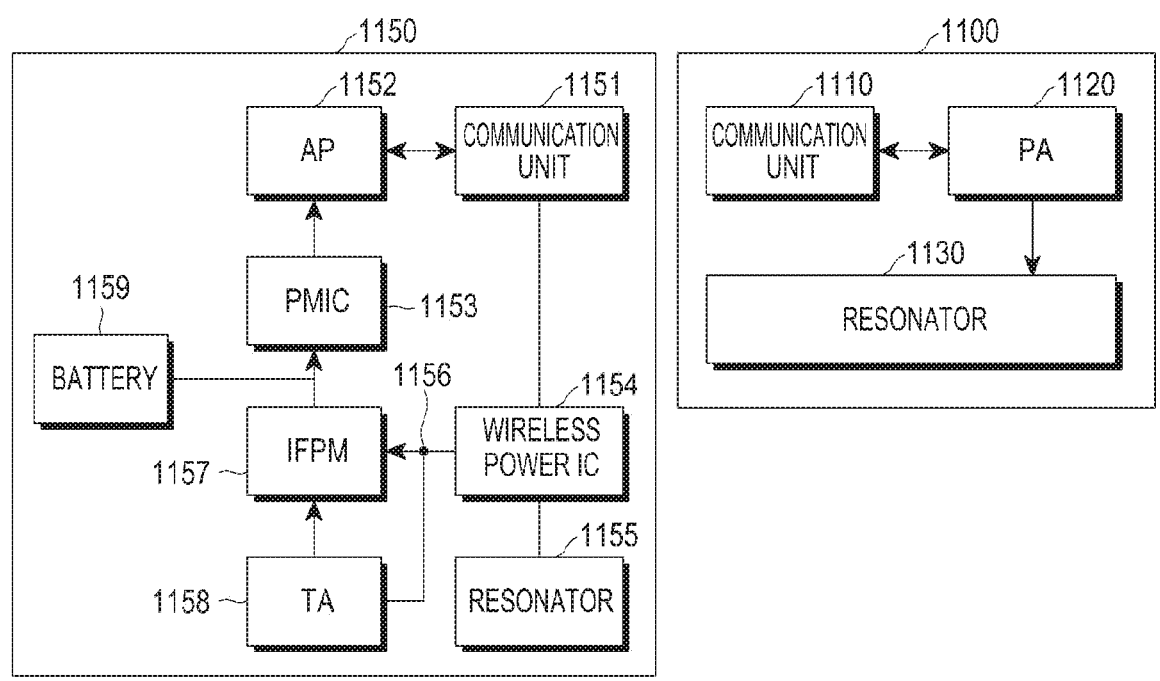
FIG. 11 is a block diagram of a wireless power transmitting unit and a wireless power receiving unit according to an embodiment of the present invention.

FIG. 11 is a block diagram of a wireless power transmitting unit and a wireless power receiving unit according to an embodiment of the present invention.

A wireless power transmitting unit 1100 includes a communication unit 1110, a Power Amplifier (PA) 1120, and a resonator 1130. A wireless power receiving unit 1150 includes a communication unit 1151, an Application Processor (AP) 1152, a Power Management Integrated Circuit (PMIC) 1153, a Wireless Power Integrated Circuit (WPIC) 1154, a resonator 1155, an interFace Power Management (IFPM) IC 1157, a Travel Adapter (TA) 1158, and a battery 1159.

The communication unit 1110 communicates with the communication unit 1151 based on a predetermined scheme, for example, a BLE scheme. For example, the communication unit 1151 of the wireless power receiving unit 1150 transmits a PRU dynamic signal having the data structure as shown in Table 3 to the communication unit 1110 of the wireless power transmitting unit 1100. As described above, the PRU dynamic signal may include at least one of voltage information, current information, temperature information, and alert information of the wireless power receiving unit 1150.

Based on the received PRU dynamic signal, a power value output from the power amplifier 1120 may be adjusted. For example, when the over voltage, the over current, and the over temperature are applied to the wireless power receiving unit 1150, a power value output from the power amplifier 1120 is reduced. Further, when a voltage or current of the wireless power receiving unit 1150 is smaller than a preset value, a power value output from the power amplifier 1120 is increased.

Charging power from the resonator 1130 may be wirelessly transmitted to the resonator 1155.

The WPIC 1154 rectifies the charging power received from the resonator 1155 and performs DC/DC conversion. The WPIC 1154 drives the communication unit 1151 or charges the battery 1159 by using the converted power.

Meanwhile, a wired charging terminal may be inserted into the travel adapter 1158. A wired charging terminal such as a 30-pin connector or a Universal Serial Bus (USB) connector may be inserted into the travel adapter 1158, and the travel adapter 1158 receives power supplied from an external power source to charge the battery 1159.

The IFPM 1157 processes power applied from the wired charging terminal and outputs the processed power to the battery 1159 and the PMIC 1153.

The PMIC 1153 manages wirelessly received power, power received through a wire, and power applied to each of the components of the wireless power receiving unit 1150. The AP 1152 receives power information from the PMIC 1153 and controls the communication unit 1151 to transmit the PRU dynamic signal for reporting the power information.

Meanwhile, the travel adapter 1158 may be connected to a node 1156 connected to the WPIC 1154. When the wired charging connector is inserted into the travel adapter 1158, a preset voltage, for example, 5 V may be applied to the node 1156. The wireless power IC 1154 monitors the voltage applied to the node 1156 to determine whether the travel adapter is inserted.

Figure 12A:
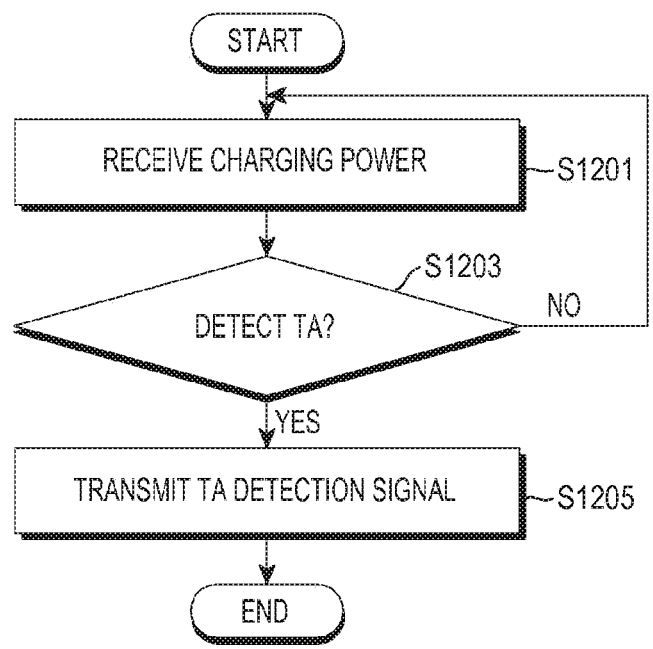
FIG. 12A is a flowchart illustrating a control method of a wireless power receiving unit according to an embodiment of the present invention.

FIG. 12A is a flowchart illustrating a control method of the wireless power receiving unit according to an embodiment of the present invention.

The wireless power receiving unit 1150 wirelessly receives charging power from the wireless power transmitting unit 1100 in step S1201. The wireless power receiving unit 1150 detects whether the wired charging terminal is inserted into the travel adapter in step S1203. For example, the wireless power receiving unit 1150 determines whether a voltage applied to a back end of the travel adapter is a preset voltage value to determine whether the wired charging terminal is inserted.

When it is determined that the wired charging terminal is inserted in step S1203, the wireless power receiving unit 1150 transmits a signal indicating the insertion of the wired charging terminal to the wireless power transmitting unit 1100 in step S1205. For example, the wireless power receiving unit 1150 transmits a PRU dynamic signal indicating TA detect(3) in the PRU alert field of Table 3 to the wireless power transmitting unit 1100. Alternatively, the wireless power receiving unit 1150 may transmit the signal indicating the insertion of the wired charging terminal to the wireless power transmitting unit 1100 as a signal separate from the PRU dynamic signal. Meanwhile, the wireless power receiving unit 1150 may stop the wireless charging by releasing the connection with the resonator 1155.

Figure 12B:
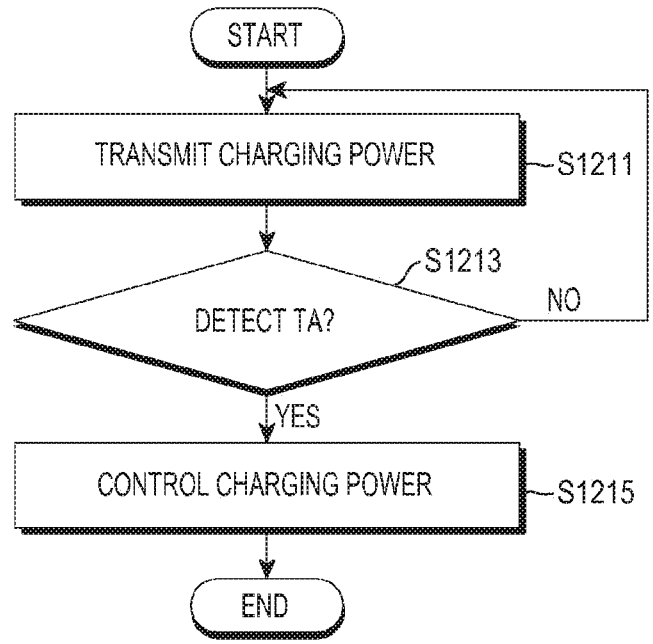
FIG. 12B is a flowchart for describing a control method of a wireless power transmitting unit according to an embodiment of the present invention.

FIG. 12B is a flowchart illustrating a control method of the wireless power transmitting unit according to an embodiment of the present invention.

The wireless power transmitting unit 1100 wirelessly transmits charging power to the wireless power receiving unit 1150 in step S1211. The wireless power transmitting unit receives the signal indicating the insertion of the wired charging terminal into the travel adapter from the wireless power receiving unit 1150 in step S1213. When receiving the signal indicating the insertion of the wired charging terminal in step S1213, the wireless power transmitting unit 1100 controls an amount of the charging power in step S1215. For example, the wireless power transmitting unit 1100 performs a control such that the charging power is not transmitted by adjusting the amount of the charging power to 0.

According to the above description, when the wireless power receiving unit 1150 performs the wired charging, the wireless charging is stopped and the over current is prevented from being applied.

Figure 13:
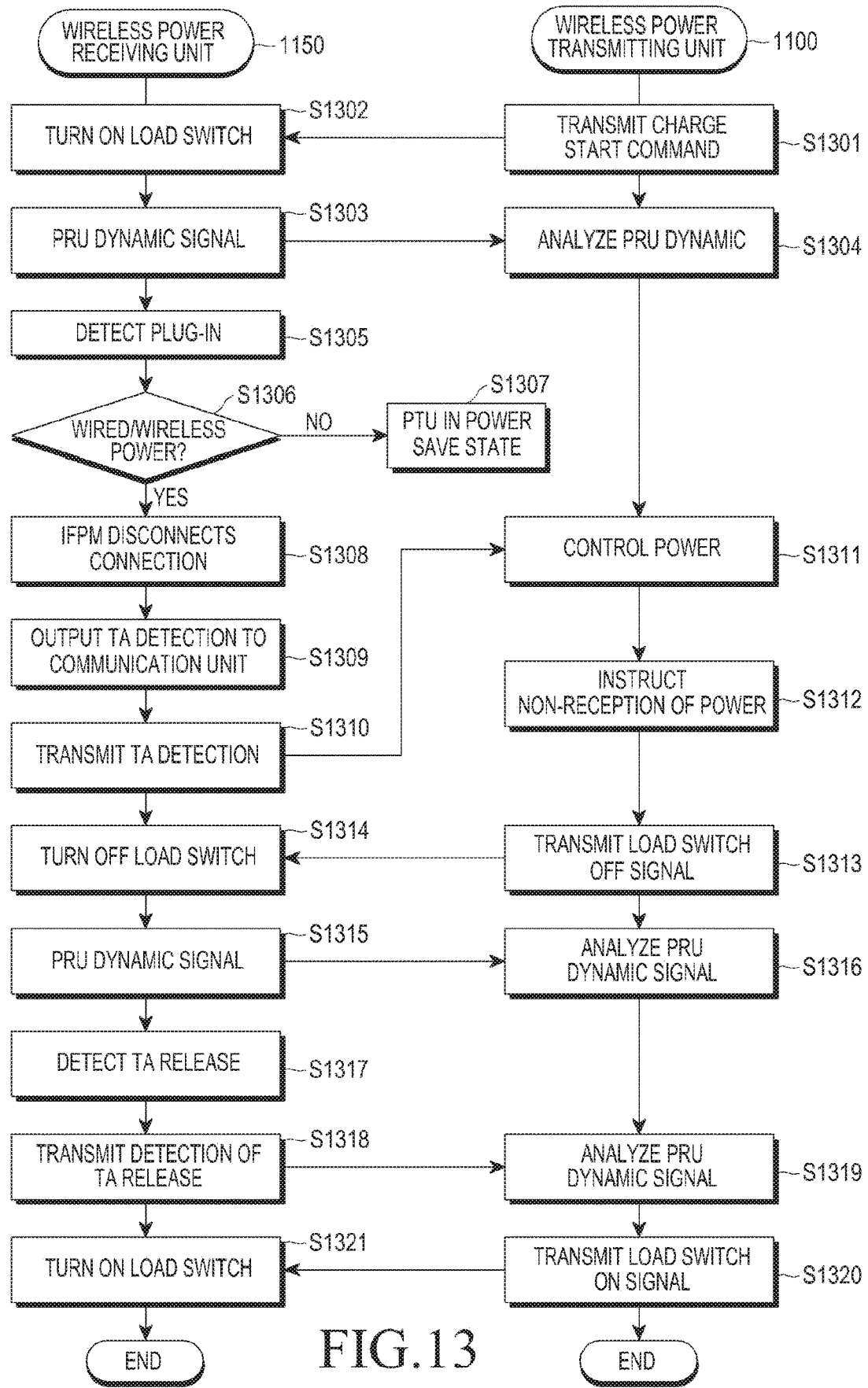
FIG. 13 is a flowchart illustrating operations of a wireless power transmitting unit and a wireless power receiving unit according to an embodiment of the present invention.

FIG. 13 is a flowchart illustrating operations of the wireless power transmitting unit and the wireless power receiving unit according to an embodiment of the present invention.

The wireless power transmitting unit 1100 transmits a charging initiation command signal to the wireless power receiving unit 1150 in step S1301. In response to the signal, the wireless power receiving unit 1150 performs the wireless charging by controlling a load switch to be in an on state in step S1302. The wireless power receiving unit 1150 transmits the PRU dynamic signal in step S1303 and the wireless power transmitting unit 1100 receives and analyzes the PRU dynamic signal in step S1304. Accordingly, the wireless power transmitting unit 1100 identifies information such as the voltage, current, temperature of the wireless power receiving unit 1150 or wireless charging environment change such as the wired charging terminal insertion.

Meanwhile, the user may insert the wired charging terminal into the wireless power receiving unit 1150 and the wireless power receiving unit 1150 detects the insertion in step S1305. The wireless power receiving unit 1150 determines whether wired or wireless power is provided in step S1306. When neither the wired and wireless power are provided in step S1306, the wireless power transmitting unit 1100 may enter the low power mode in step S1307. When it is determined that both the wired charging and the wireless charging are performed in step S1306, the IFPM 1157 of the wireless power receiving unit 1150 stops the wireless charging by releasing the connection with the resonator 1155 in step S1308.

The wireless power receiving unit 1150 outputs wired charging terminal insertion detection (=TA (Travel Adapter) detection) to the communication unit 1151 in step S1309 and the communication unit 1151 transmits a wired charging terminal insertion detection (=TA detection) signal to the wireless power transmitting unit 1100 in step S1310. The wireless power transmitting unit 1100 controls the charging power in accordance with the wired charging terminal insertion detection signal in step S1311. For example, the wireless power transmitting unit 1100 performs a control such that the wireless charging is stopped by adjusting the charging power to 0.

The wireless power transmitting unit 1100 instructs non-reception of power in step S1312 and transmits a load switch off signal to the wireless power receiving unit 1150 in step S1313. The wireless power receiving unit 1150 receives the load switch off signal to control a load switch to be in an off state in step S1314.

The wireless power receiving unit 1150 periodically transmits the PRU dynamic signal in step S1315. The wireless power transmitting unit 1100 receives and analyzes the PRU dynamic signal in step S1316.

Meanwhile, the wireless power receiving unit 1150 detects that the wired charging terminal insertion has been released in step S1317. For example, the wireless power receiving unit 1150 detects the release of the wired charging terminal insertion by detecting a change in a voltage applied to a back end of the travel adapter 1158. The wireless power receiving unit 1150 transmits a wired charging terminal insertion release detection signal to the wireless power transmitting unit 1100 in step S1318. For example, the wireless power receiving unit 1150 transmits the wired charging terminal insertion release detection signal as the PRU dynamic signal or a single signal. The wireless power transmitting unit 1100 detects the release of the wired charging terminal insertion from the wireless power receiving unit 1150 by analyzing the PRU dynamic signal or the single signal in step S1319.

The wireless power transmitting unit 1100 transmits a load switch on signal to the wireless power receiving unit 1150 in step S1320 and the wireless power receiving unit 1150 receives the load switch on signal to control the load switch to be in the on state in step S1321. Meanwhile, the wireless power transmitting unit 1100 performs the wireless charging by controlling the charging power again and the wireless power receiving unit 1150 performs the wireless charging by controlling the load switch to be in the on state.

According to the above description, the wireless power transmitting unit 1100 detects the insertion or removal of the wired charging terminal into/from the wireless power receiving unit 1150. The wireless power transmitting unit may prevent power waste and over power from being applied to the wireless power receiving unit 1150 by controlling the charging power according to the insertion or the removal of the wired charging terminal.

Figure 14:
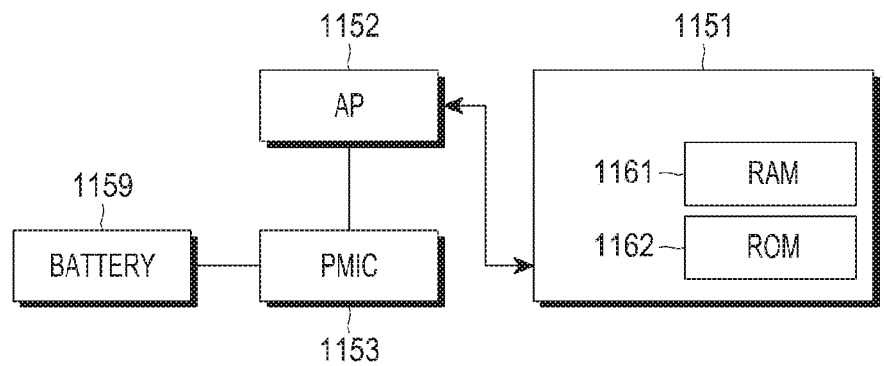
FIG. 14 is a block diagram of a communication unit and peripheral components of a wireless power receiving unit according to an embodiment of the present invention.

FIG. 14 is a block diagram of the communication unit and peripheral components of the wireless power receiving unit according to an embodiment of the present invention.

As illustrated in FIG. 14, the communication unit 1151 of the wireless power receiving unit 1150 includes a Random Access Memory (RAM) 1161 and a Read Only Memory (ROM) 1162. The communication unit 1151 communicates with the wireless power transmitting unit 1100 based on a predetermined scheme, for example, a BLE scheme. Accordingly, a stack of a predetermined communication scheme, for example, a BLE stack is loaded to the RAM 1161 of the communication unit 1151. The communication unit 1151 receives the BLE stack from the AP 1152 to load the BLE stack to the RAM 1161. As described above, a mode in which the communication unit 1151 receives a stack of a predetermined communication scheme from the AP 1152 to load the stack to the RAM 1161 is referred to as a Non Stand Alone (NSA) mode.

Meanwhile, the wireless power receiving unit 1150 may be arranged on the wireless power transmitting unit 1100 after the battery 1159 is discharged. Since the battery 1159 of the wireless power receiving unit 1150 is discharged, the AP 1152 cannot be driven.

The wireless power receiving unit 1150 may drive the communication unit 1151 of the wireless power receiving unit 1150 by receiving a power detection beacon. However, as described above, since the AP 1152 is not driven, the communication unit 1151 cannot receive a stack of a predetermined communication scheme from the AP 1152. The communication unit 1151 may store the stack of the predetermined communication scheme in the ROM 1162 and communicate with the wireless power transmitting unit 1100 by using the stack of the predetermined communication scheme stored in the ROM 1162. As described above, a mode in which the communication unit 1151 performs the communication by using the stack of the predetermined communication scheme stored in the ROM 1162 is referred to as a Stand Alone (SA) mode.

Figure 15A:
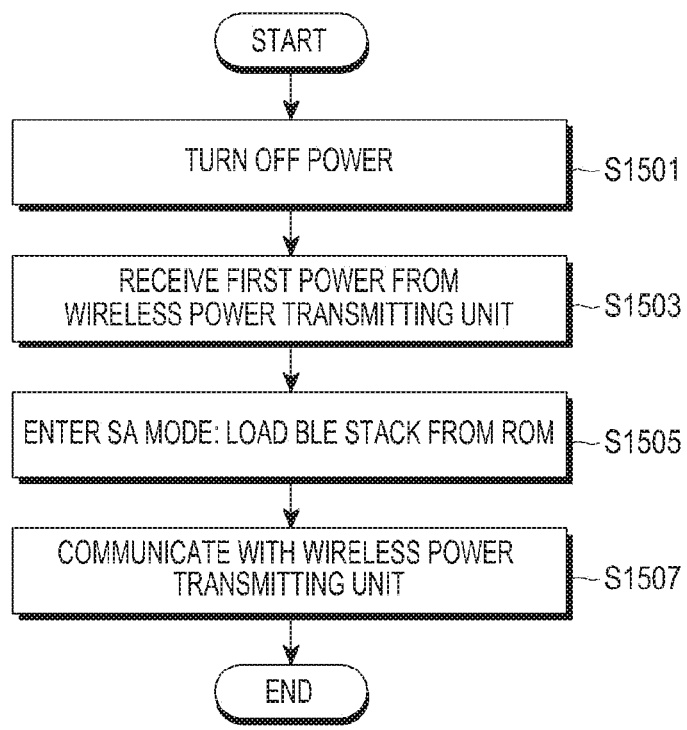
FIG. 15A is a flowchart illustrating a control method of a wireless power receiving unit according to an embodiment of the present invention.

FIG. 15A is a flowchart illustrating a control method of the wireless power receiving unit according to an embodiment of the present invention.

The wireless power receiving unit 1150 turns off power by the discharging the battery 1159 in step S1501. The wireless power receiving unit 1150 receives first power which can drive the communication unit 1151 from the wireless power transmitting unit 1100 in step S1503 and drives the communication 1151 by using the first power. The wireless power receiving unit 1150 enters the SA mode, for example, load the BLE stack from the ROM 1162 in step S1505. The communication unit 1151 of the wireless power receiving unit 1150 communicates with the wireless power receiving unit 1100 by using the loaded BLE stack in step S1507.

Figure 15B:
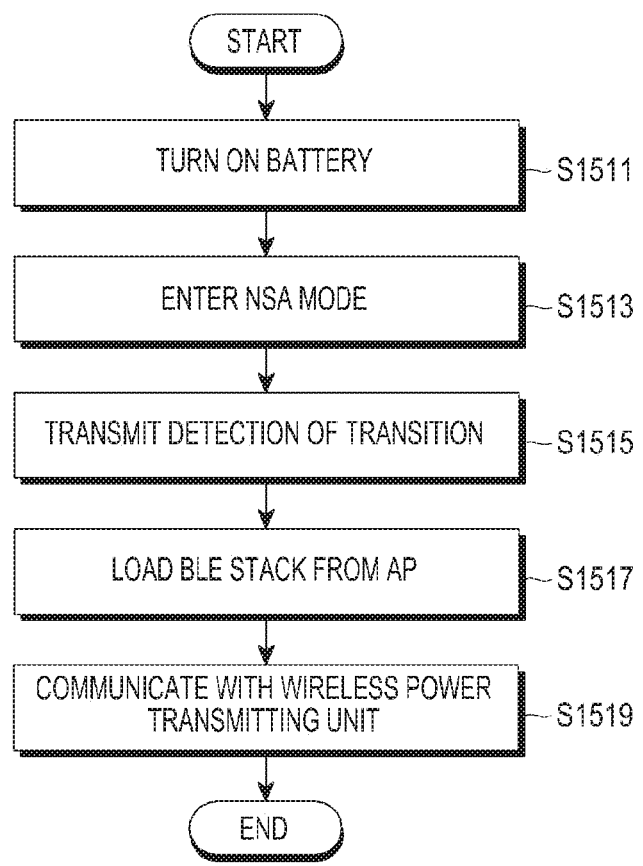
FIG. 15B is a flowchart illustrating a control method of a wireless power receiving unit according to an embodiment of the present invention.

FIG. 15B is a flowchart illustrating a control method of a wireless power receiving unit according to an embodiment of the present invention.

The wireless power receiving unit 1150 performs the wireless charging while operating in the SA mode. Based on the wireless charging, the wireless power receiving unit 1150 turns on the battery 1159 and the AP 1152 in step S1511. The wireless power receiving unit 1150 switches the SA mode to the NSA mode in step S1513. The wireless power receiving unit 1150 transmits a mode transition detection signal to the wireless power transmitting unit 1100 in step S1515. The wireless power receiving unit 1150 loads the BLE stack from the AP 1152 in step S1517 and reinitiates communication with the wireless power transmitting unit 1100 in step S1519.

Figure 15C:
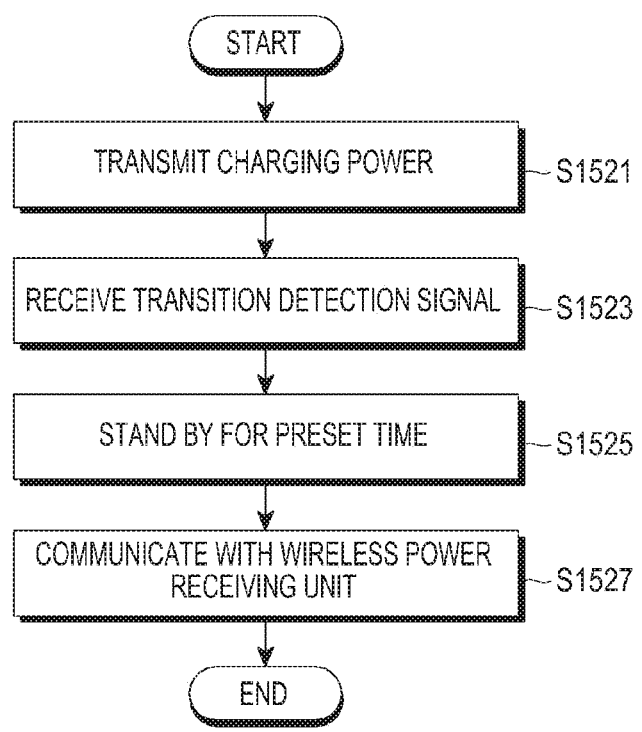
FIG. 15C is a flowchart illustrating a control method of a wireless power transmitting unit according to an embodiment of the present invention.

FIG. 15C is a flowchart illustrating a control method of the wireless power transmitting unit according to an embodiment of the present invention.

The wireless power transmitting unit 1100 transmits charging power to the wireless power receiving unit 1150 in step S1521. The wireless power transmitting unit 1100 receives the transition detection signal from the SA mode to the NSA mode from the wireless power receiving unit 1150 in step S1523. The wireless power transmitting unit 1100 stands by for a preset waiting time in step S1525. For example, when the wireless power transmitting unit 1100 does not receive a signal from the wireless power receiving unit 1150 for one second, the wireless power transmitting unit 1100 may be set to exclude the wireless power receiving unit 1150 from the wireless power network. However, when the wireless power transmitting unit 1100 receives the transition detection signal from the SA mode to the NSA mode from the wireless power receiving unit 1150, the wireless power transmitting unit 1100 does not exclude the wireless power receiving unit 1150 from the wireless power network even though the signal is not received from the wireless power receiving unit 1150 for the preset waiting time.

When the preset waiting time arrives, the wireless power transmitting unit 1100 communicates with the wireless power receiving unit 1150 again in step S1527.

According to the above description, when the wireless power receiving unit 1150 switches the SA mode to the NSA mode, the communication with the wireless power transmitting unit 1100 may be disconnected for a predetermined time. However, even though the signal is not received from the wireless power receiving unit 1150 for the preset waiting time, the wireless power transmitting unit 1100 does not exclude the wireless power receiving unit 1150 from the wireless power network by receiving the transition signal from the SA mode to the NSA mode. Accordingly, an unintended error by the mode transition of the wireless power receiving unit can be prevented.

According to the above description, the wireless power transmitting unit 1100 detects a change in a wireless power transmission environment such as the mode transition and does not exclude the wireless power receiving unit 1150 from the wireless power network.

Figure 16A:
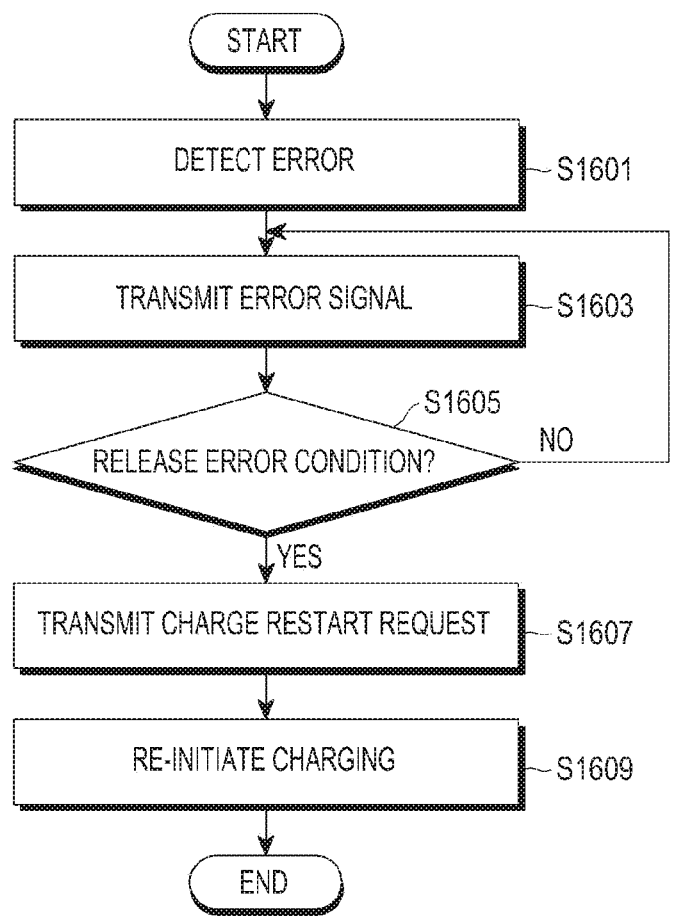
FIGS. 16A and 16B are flowcharts of control methods of a wireless power receiving unit and a wireless power transmitting unit according to embodiments of the present invention.
Figure 16B:
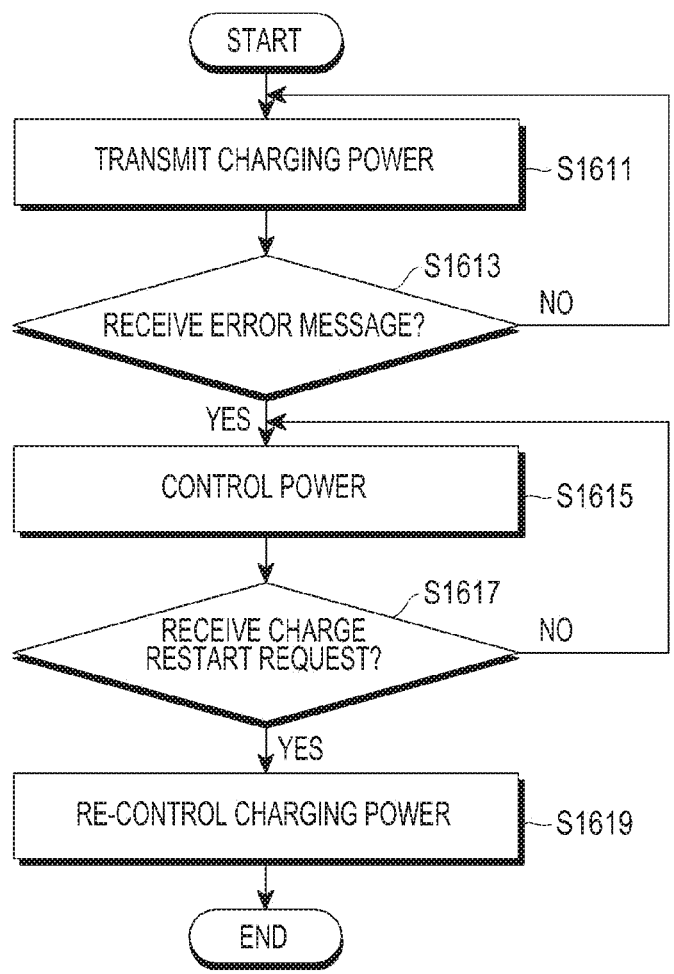

FIGS. 16A and 16B are flowcharts of control methods of the wireless power receiving unit and the wireless power transmitting unit according to embodiments of the present invention.

Referring to FIG. 16A, the wireless power receiving unit 1150 detects an error in step S1601. The error refers to generation of at least one of over current, over voltage, and over temperature of the wireless power receiving unit 1150. The wireless power receiving unit 1150 transmits an error signal indicating the generation of the error to the wireless power transmitting unit 1100 in step S1603.

The wireless power receiving unit 1150 determines whether the error state is released in step S1605. When it is determined that the error state is released in step S1605, the wireless power receiving unit 1150 transmits a charging restart request signal to the wireless power transmitting unit 1100 in step S1607. The wireless power receiving unit 1150 receives charging power from the wireless power transmitting unit 1100 to restart the charging in step S1609. The charging restart request signal may be written as restart request(1) in the PRU alert field of the PRU dynamic signal of Table 3 and transmitted. Alternatively, the charging restart request signal may be transmitted as a single signal.

Referring to FIG. 16B, the wireless power transmitting unit 1100 transmits charging power to the wireless power receiving unit 1150 in step S1611. It is assumed that the charging power transmitted to the wireless power receiving unit 1150 by the wireless power transmitting unit 1100 has a first power value. Meanwhile, the wireless power transmitting unit 1100 determines if an error signal is received from the wireless power receiving unit 1150 in step S1613. When the error signal is received in step S1613, the wireless power transmitting unit 1100 adjusts the charging power to a second power value from the first power value in step S1615. The second power value may be smaller than the first power value, and charging power having a relatively small value may be transmitted until the error state is released.

Meanwhile, the wireless power transmitting unit 1100 determines if the charging restart request signal is received from the wireless power receiving unit 1150 in step S1617. When the charging restart request signal is received in step S1617, the wireless power transmitting unit 1100 adjusts again the charging power to the first power value from the second power value and transmits the charging power to the wireless power receiving unit 1150 in step S1619. Accordingly, when the error state is released, the charging power is restored and then transmitted.

According to the above description, the wireless power transmitting unit 1100 can detect the wireless power transmission environment change such as the error state generation and the error state release, and controls the charging power value according to the detection, so as to efficiently perform the wireless charging.

Figure 17:
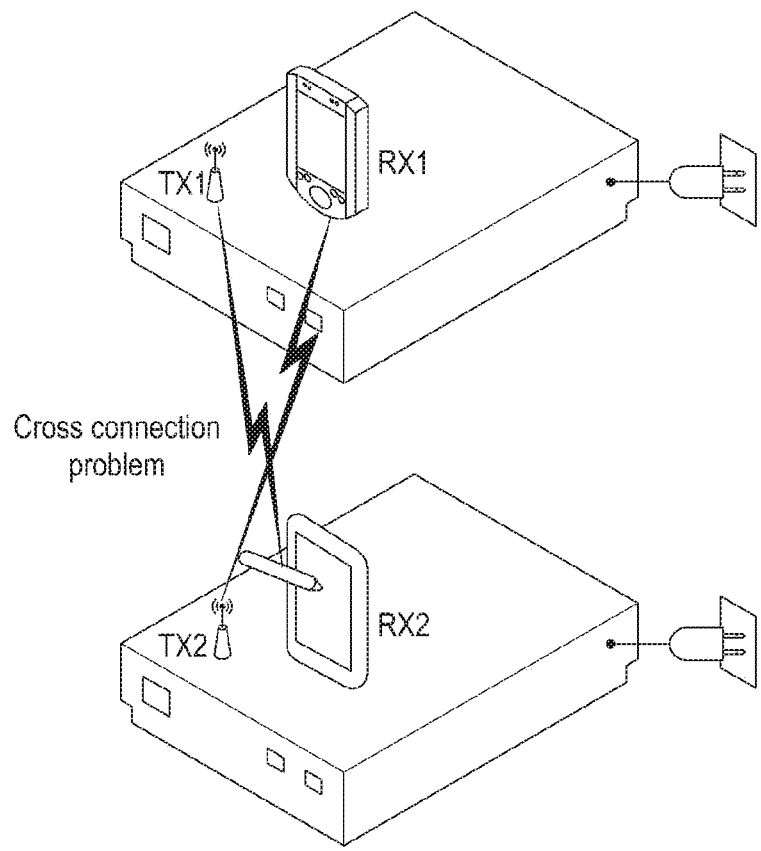
FIG. 17 illustrates a concept for describing cross-communication.

FIG. 17 illustrates a concept for describing a cross-connection. In FIG. 17, a first wireless power transmitting unit TX1 and a second wireless power transmitting unit TX2 are disposed. Further, a first wireless power receiving unit RX1 is disposed on the first wireless power transmitting unit TX1, and a second wireless power receiving unit RX2 is disposed on the second wireless power transmitting unit TX2. Here, the first wireless power transmitting unit TX1 transmits power to the first wireless power receiving unit RX1 located on or near the first wireless power transmitting unit TX1. In addition, the second wireless power transmitting unit TX2 transmits power to the second wireless power receiving unit RX2 located on or near the second wireless power transmitting unit TX2. Accordingly, it is preferable that the first wireless power transmitting unit TX1 performs communication with the first wireless power receiving unit RX1 and the second wireless power transmitting unit TX2 performs communication with the second wireless power receiving unit RX2. However, according to an increase in a communication distance, the first wireless power receiving unit RX1 may subscribe to a wireless power network controlled by the second wireless power transmitting unit TX2, and the second wireless power receiving unit RX2 may subscribe to a wireless power network controlled by the first wireless power transmitting unit TX1. This is referred to as cross-connection.

Accordingly, a problem may occur in which the first wireless power transmitting unit TX1 transmits power requested by the second wireless power receiving unit RX2, not power requested by the first wireless power receiving unit RX1. When a capacity of the second wireless power receiving unit RX2 is greater than that of the first wireless power receiving unit RX1, over capacity power may be applied to the first wireless power receiving unit RX1, which causes a problem. Further, when the capacity of the second wireless power receiving unit RX2 is less than that of the first wireless power receiving unit RX1, a problem occurs in which the first wireless power receiving unit RX1 may receive power less than its charging capacity.

Accordingly, the wireless power transmitting unit is required to exclude the cross-connected wireless power receiving units from the wireless power network.

Figure 18:
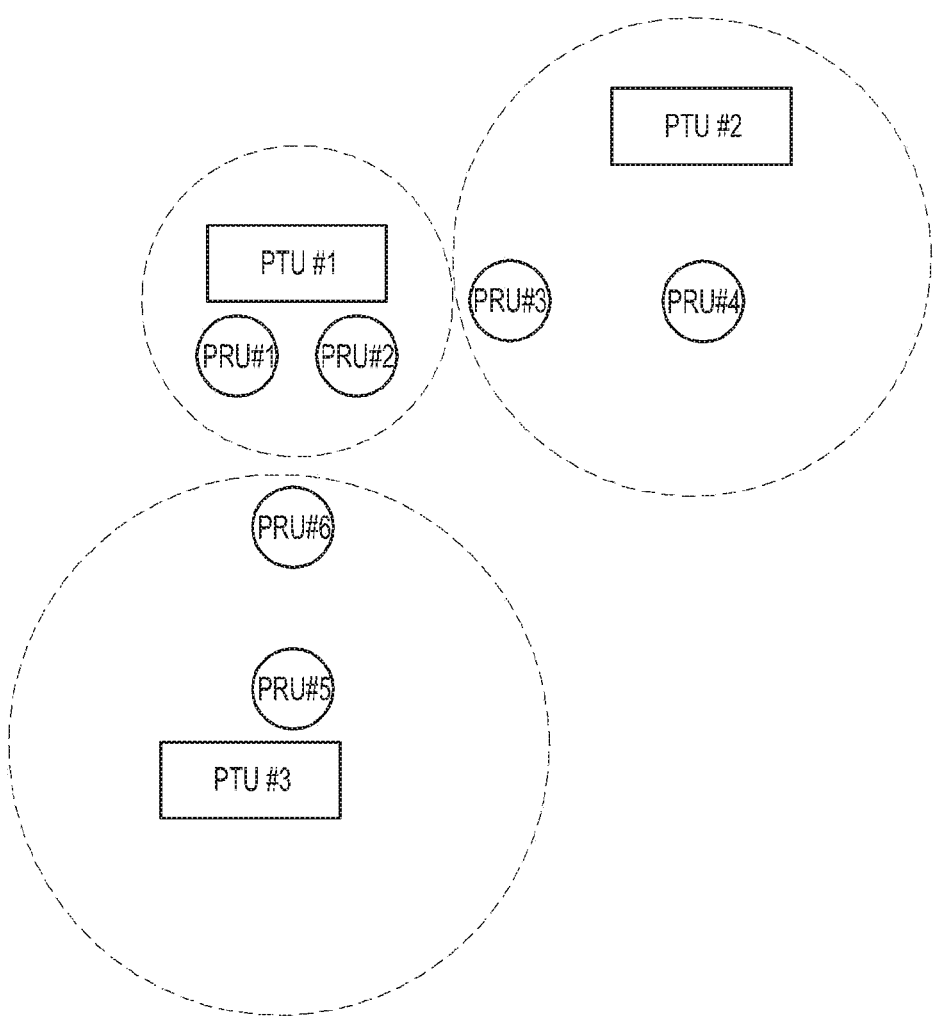
FIG. 18 illustrates a concept for describing an arrangement relation between a wireless power transmitting unit and a wireless power receiving unit.

FIG. 18 illustrates a concept for describing an arrangement relation between the wireless power transmitting unit and the wireless power receiving unit according to an embodiment of the present invention.

In FIG. 18, a first wireless power transmitting unit PTU #1, a second wireless power transmitting unit PTU #2, and a third wireless power transmitting unit PTU #3 are arranged. Further, a first wireless power receiving unit PRU #1 (or RX1), a second wireless power receiving unit PRU #2, a third wireless power receiving unit PRU #3, a fourth wireless power receiving unit PRU #4, a fifth wireless power receiving unit PRU #5, and a sixth wireless power receiving unit PRU #6 are arranged. Particularly, the first wireless power receiving unit PRU #1 and the second wireless power receiving unit PRU #2 are located within a chargeable range of the first wireless power transmitting unit PTU #1. Further, the third wireless power receiving unit PRU #3 and the fourth wireless power receiving unit PRU #4 are located within a chargeable range of the second wireless power transmitting unit PTU #2. In addition, the fifth wireless power receiving unit PRU #5 and the sixth wireless power receiving unit PRU #6 are located within a chargeable range of the third wireless power transmitting unit PTU #3.

The first wireless power transmitting unit PTU #1 forms communication connections with the first wireless power receiving unit PRU #1 and the second wireless power receiving unit PRU #2 located within the chargeable range. However, a communication distance of the first wireless power transmitting unit PTU #1 may be relatively wider than the chargeable range. The first wireless power transmitting unit PTU #1 may form communication connections with the third wireless power receiving unit PRU #3 and the fourth wireless power receiving unit PRU #4 arranged outside the chargeable range.

When the first wireless power transmitting unit PTU #1 forms communication connections with the third wireless power receiving unit PRU #3 and the fourth wireless power receiving unit PRU #4, the first wireless power transmitting unit PTU #1 may apply a sum of first power, second power, third power, and fourth power to be transmitted to the first wireless power receiving unit PRU #1 to the fourth wireless power receiving unit PRU #4, respectively. Accordingly, the first wireless power transmitting unit PTU #1 may transmit the sum of the first power, the second power, the third power, and the fourth power, not merely a sum of the first power and the second power, to the first wireless power receiving unit PRU #1 and the second wireless power receiving unit PRU #2. Accordingly, the first wireless power transmitting unit PTU #1 wastes power, and the first wireless power receiving unit PRU #1 and the second wireless power receiving unit PRU #2 are applied over power.

Accordingly, a solution is required whereby the first wireless power transmitting unit PTU #1 should disconnect the communication connections with the third wireless power receiving unit PRU #3 and the fourth wireless power receiving unit PRU #4. Further, a technique by which the first wireless power transmitting unit PTU #1 determines that the third wireless power receiving unit PRU #3 and the fourth wireless power receiving unit PRU #4 are cross-connected wireless power receiving units is also required. Hereinafter, based on various embodiments, a configuration of determining a cross-connected wireless power receiving unit will be described.

Figure 19:
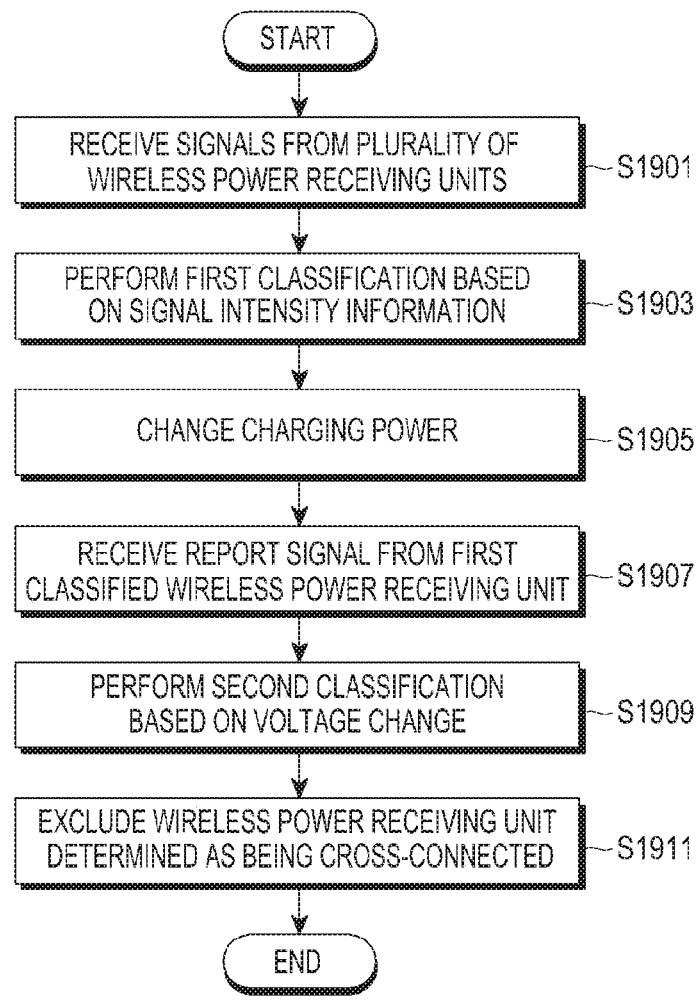
FIG. 19 is a flowchart illustrating a method of determining a cross-connected wireless power receiving unit according to an embodiment of the present invention.
Figure 20A:
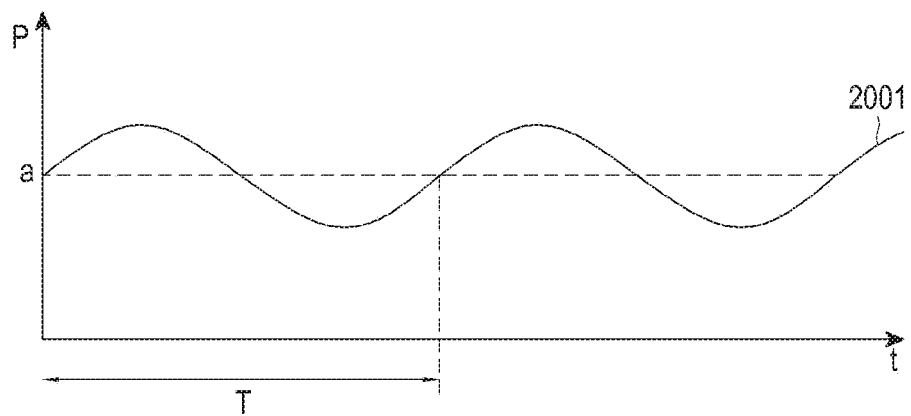
FIG. 20A is a graph showing a change in transmission power of a wireless power transmitting unit according to an embodiment of the present invention.
Figure 20B:
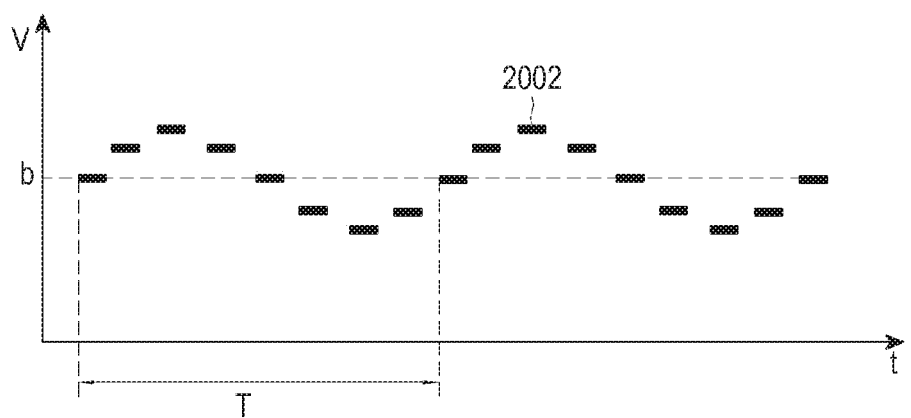
FIG. 20B is a graph showing a change in a voltage of a wireless power receiving unit according to an embodiment of the present invention.

FIG. 19 is a flowchart illustrating a method of determining a cross-connected wireless power receiving unit according to an embodiment of the present invention. FIG. 20A is a graph showing a change in transmission power of a wireless power transmitting unit, and FIG. 20B is a graph showing a change in a voltage of a wireless power receiving unit according to an embodiment of the present invention.

The wireless power receiving unit receives a signal from one or more wireless power receiving units in step S1901. For example, the wireless power transmitting unit receives the advertisement signal described in connection with FIG. 4, such as a PTU searching signal, from the one or more wireless power receiving units.

The wireless power transmitting unit performs a first wireless power receiving unit classification step based on an intensity of the advertisement signal received from the wireless power receiving unit in step S1903. For example, the wireless power transmitting unit determines whether a Received Signal Strength Indicator (RSSI) of each of the advertisement signals received from the one or more wireless power receiving units is greater than a preset reference value. The wireless power transmitting unit determines that the wireless power receiving unit having transmitted the advertisement signal greater than the preset reference value is a wireless power receiving unit to be connected based on the first classification step.

In another embodiment, the wireless power transmitting unit may identify all RSSIs of the advertisement signals received from the one or more wireless power receiving units. The wireless power transmitting unit identifies a minimum RSSI, sets an offset based on the minimum RSSI, and sets a determination range of the wireless power receiving unit to be communicated with. The wireless power transmitting unit determines a wireless power receiving unit having transmitted the advertisement signal having an RSSI within the determination range of the wireless power receiving unit to be communicated with as the wireless power receiving unit to be communicated with based on the first classification step.

Meanwhile, the wireless power transmitting unit changes an amount of power transmitted to the wireless power receiving unit in step S1905. For example, as illustrated in FIG. 20A, the wireless power transmitting unit may change an amount of transmitted power 2001 to a form of a sine wave based on 'a'. The wireless power transmitting unit may change the transmitted power 2001 according to a preset time period T. Meanwhile, the change of the sine wave of the transmitted power 2001 as illustrated in FIG. 20A is only an example.

The wireless power transmitting unit receives a report signal from the first classified wireless power receiving unit in step S1907. The wireless power transmitting unit receives, for example, a PRU dynamic signal from the wireless power receiving unit. As described above with reference to Table 3, the PRU dynamic signal may include information on a current value or a voltage value of the wireless power receiving unit.

The wireless power transmitting unit performs a second classification step based on the change in the voltage value of the wireless power receiving unit in step S1909. For example, the wireless power transmitting unit determines whether a size of the voltage of the wireless power receiving unit has been changed in accordance with a change in a size of transmitted power. For example, the wireless power transmitting unit may receive a report of a voltage size 2002 of the wireless power receiving unit as illustrated in FIG. 20B. In FIG. 20B, it is noted that the voltage size 2002 of the wireless power receiving unit has the form of a sine wave based on 'b', and particularly, is changed on a period of T. The wireless power transmitting unit may determine the wireless power receiving unit of which the voltage size 2002 is changed according to the T period as the wireless power receiving unit to be communicated with. Further, the wireless power transmitting unit may determine that a wireless power receiving unit having a voltage irrelevant to the change of the transmitted power is the cross-connected wireless power receiving unit.

The wireless power transmitting unit disconnects the communication connection with the wireless power receiving unit determined to be cross-connected in step S1911.

Figure 21:
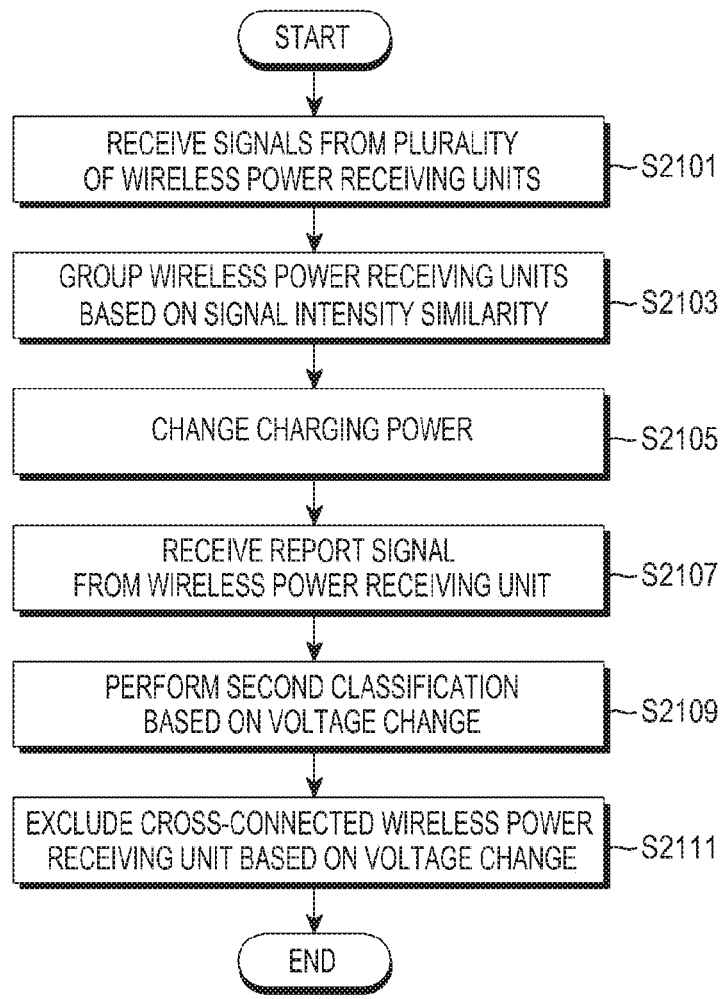
FIG. 21 is a flowchart illustrating a method of determining a cross-connected wireless power receiving unit according to another embodiment of the present invention.
Figure 22:
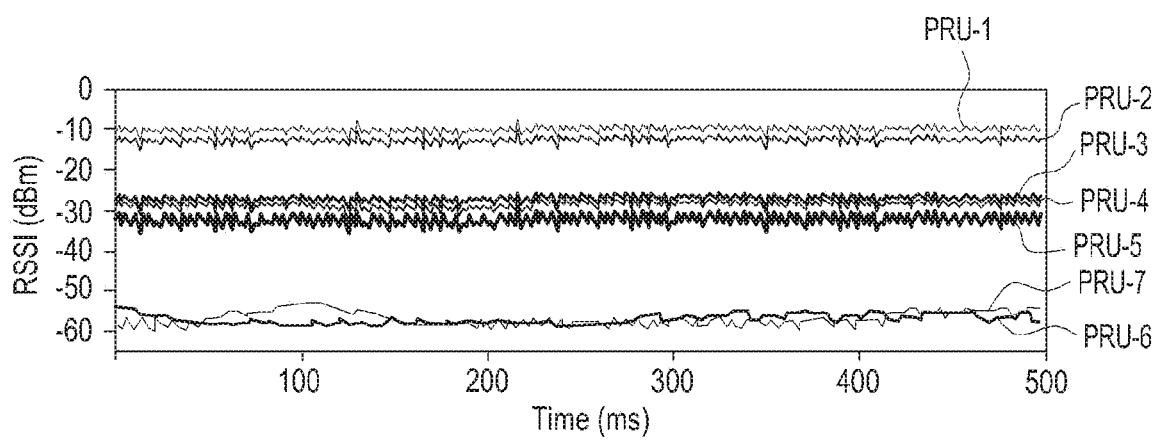
FIG. 22 is a graph showing intensities of signals from wireless power receiving units according to an embodiment of the present invention.

FIG. 21 is a flowchart illustrating a method of determining a cross-connected wireless power receiving unit according to another embodiment of the present invention. FIG. 22 is a graph showing intensities of signals from wireless power receiving units according to an embodiment of the present invention.

The wireless power transmitting unit receives a signal from one or more wireless power receiving units in step S2101. For example, the wireless power transmitting unit receives the advertisement signal described in connection with FIG. 4, such as a PTU searching signal, from the one or more wireless power receiving units.

The wireless power transmitting unit performs a first wireless power receiving unit classification step to group the wireless power receiving units based on similarity of the intensities of the advertisement signals received from the wireless power receiving units in step S2103.

The wireless power transmitting unit measures intensities of signals from the wireless power receiving units as illustrated in FIG. 22. In FIG. 22, an x axis is time and a y axis is an RSSI. The wireless power transmitting unit groups the wireless power receiving units based on RSSI similarity. Accordingly, the wireless power transmitting unit classifies one or more wireless power receiving units into a first group, a second group, and a third group.

Meanwhile, the wireless power transmitting unit changes an amount of power transmitted to the wireless power receiving unit in step S2105. The wireless power transmitting unit receives signals from the one or more wireless power receiving units in step S2107. The wireless power transmitting unit receives, for example, a PRU dynamic signal from the wireless power receiving unit. As described above with reference to Table 3, the PRU dynamic signal may include information on a current value or a voltage value of the wireless power receiving unit.

The wireless power transmitting unit performs a second classification step based on the change in the voltage value of the wireless power receiving unit in step S2109. For example, the wireless power transmitting unit determines that a group of the wireless power receiving units of which voltages are changed in accordance with the change in the transmitted power are the wireless power receiving units to be communicated with. Further, the wireless power transmitting unit determines that the wireless power receiving units in the remaining groups are the cross-connected wireless power receiving units and disconnects the communication connection to these wireless power receiving units in step S2111.

Figure 23:
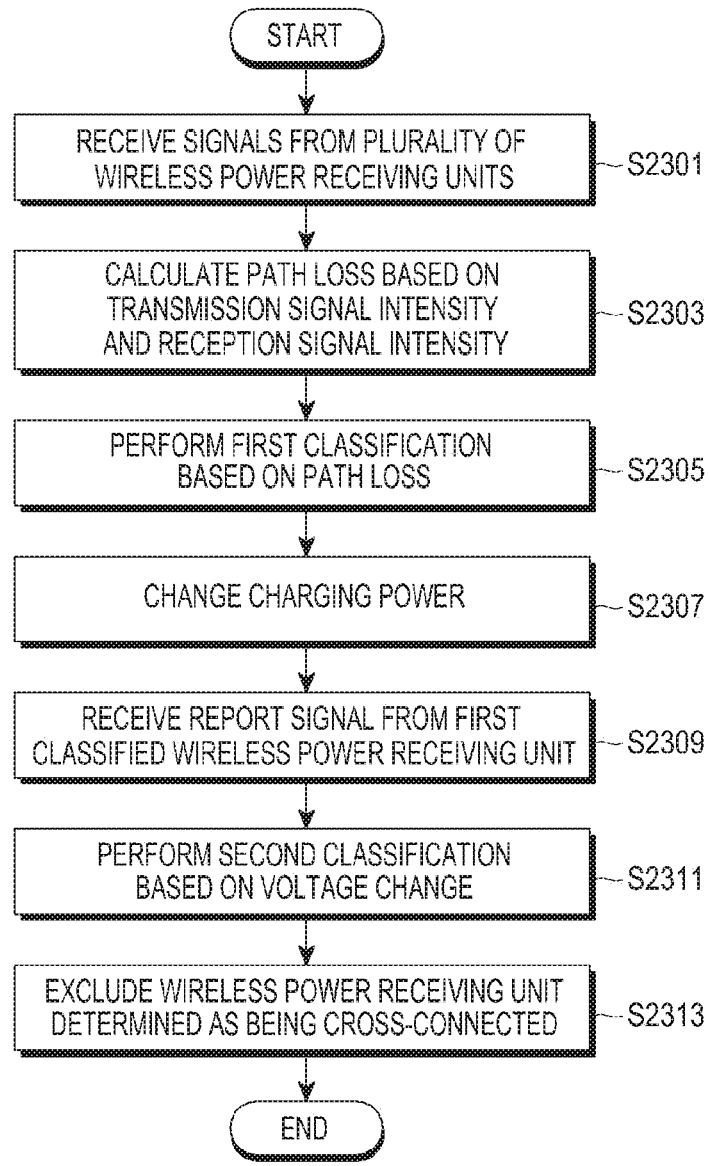
FIG. 23 is a flowchart illustrating a method of determining a cross-connected wireless power receiving unit according to another embodiment of the present invention.

FIG. 23 is a flowchart illustrating a method of determining a cross-connected wireless power receiving unit according to another embodiment of the present invention.

The wireless power transmitting unit receives signals from one or more wireless power receiving units in step S2301. For example, the wireless power transmitting unit receives the advertisement signal described in connection with FIG. 4, such as a PTU searching signal, from the one or more wireless power receiving units. Meanwhile, when the wireless power receiving unit transmits the advertisement signal, transmission output information may be also transmitted. That is, the advertisement signal includes transmission intensity information.

The wireless power transmitting unit receives the advertisement signal and determines a reception intensity, a Link Quality Indicator (LQI), or an RSSI. The wireless power transmitting unit calculates a path loss based on the transmission output information and the reception intensity of the advertisement signal in step S2303. The wireless power transmitting unit determines a distance between the wireless power transmitting unit and the wireless power receiving unit through the calculated path loss and Equation (1) below.

$$L = 20\log_{10}\left(\frac{\lambda}{4\pi d}\right) \quad (1)$$

In Equation (1), L denotes a path loss, λ denotes a wavelength, and d denotes a distance between the wireless power transmitting unit and the wireless power receiving unit.

The wireless power transmitting unit performs a first classification step based on the calculated path loss in step S2305. For example, the wireless power transmitting unit determines that the wireless power receiving unit having a distance from the wireless power transmitting unit which is within a preset distance is the wireless power receiving unit to be communicated with.

Meanwhile, the wireless power transmitting unit changes an amount of power transmitted to the wireless power receiving unit in step S2307. The wireless power transmitting unit receives report signals from the one or more wireless power receiving units in step S2309. The wireless power transmitting unit receives, for example, a PRU dynamic signal from the wireless power receiving unit. As described above with reference to Table 3, the PRU dynamic signal may include information on a current value or a voltage value of the wireless power receiving unit.

The wireless power transmitting unit performs a second classification step based on the change in the voltage value of the wireless power receiving unit in step S2311. For example, the wireless power transmitting unit determines that the wireless power receiving unit of which the voltage is changed in accordance with the change in the transmitted power is the wireless power receiving unit to be communicated with, determines the wireless power receiving units in the remaining groups as the cross-connected wireless power receiving units, and disconnects the communication connection in step S2313.

Meanwhile, in the above description, the amount of the transmitted power is changed in a case where the second step classification is performed. In another embodiment of the present invention, the wireless power transmitting unit may determine that the wireless power receiving unit which receives a signal within a preset time after detection of a load change is the wireless power receiving unit to be communicated with. The wireless power transmitting unit receives, for example, a PTU searching signal or an advertisement signal from the wireless power receiving unit. The wireless power transmitting unit determines that the wireless power receiving unit having received the PTU searching signal or the advertisement signal within a preset time is the wireless power receiving unit to be communicated with. The wireless power transmitting unit determines that the wireless power receiving unit having received the PTU searching signal or the advertisement signal after the preset time after the detection of the load change is the cross-connected wireless power receiving unit and disconnects the communication connection.

Meanwhile, the wireless power transmitting unit according to an embodiment of the present invention may solely determine that the wireless power receiving unit having received the signal within the preset time after the detection of the load change is the wireless power receiving unit to be communicated with. For example, the wireless power transmitting unit may determine whether the wireless power receiving unit is the wireless power receiving unit to be communicated with directly based on whether a difference between a load change detection time and a time of signal reception from the wireless power receiving unit is within a preset time without performing the first classification step based on the signal intensity from the wireless power receiving unit. The aforementioned disconnection of the communication connection may be applied to a case where there is no load change detection.

Although it has been described in the example above that the wireless power receiving unit receives the PTU searching signal or the advertisement signal within the preset time after the load change detection, the order may be changed in such a manner that the load change is detected within the preset time after the reception of the signal, but the cross-connection detecting method is the same.

Further, determining the wireless power receiving unit to be connected in consideration of the load change may be performed alone without the determination step based on the signal intensity.

Meanwhile, the wireless power transmitting unit may have difficulty in detecting the load change of a wireless power receiving unit having a small size or a device having small power consumption. In this event, the wireless power receiving unit provides additional information to the wireless power transmitting unit in communication, so that determining the wireless power receiving unit to be communicated with through the load change detection by the wireless power transmitting unit may be excluded. The additional information may be category information classified according to power consumption, or a size of the wireless power receiving unit, or information indicating whether the wireless power transmitting unit can detect the load change.

More specifically, when the wireless power transmitting unit receives the PTU searching signal of the wireless power receiving unit, the wireless power transmitting unit recognizes category information of the wireless power receiving unit included in the searching signal. The category information may have a value of one of a Category 1 to Category 5 according to a type of the wireless power receiving unit.

TABLE 5

| Wireless power receiving unit category | Wireless power receiving unit type |
|---|---|
| category 1 | Bluetooth headset |
| category 2 | feature phone |
| category 3 | smart phone |
| category 4 | tablet |
| category 5 | laptop |

When the recognized category information corresponds to Category 2 to Category 5, the wireless power transmitting unit determines that the load change detection is possible. Then, the wireless power transmitting unit determines whether the reception search is performed within a preset time after the load change detection. When the reception search is performed within the preset time, the wireless power transmitting unit determines that the wireless power receiving unit is the wireless power receiving unit to be communicated with and performs the communication. Further, when there is no load change detection or the load change is detected after the preset time, the wireless power transmitting unit determines that the wireless power receiving unit is not the wireless power receiving unit to be communicated with and disconnects the communication.

Meanwhile, when the category information recognized by the wireless power transmitting unit corresponds to Category 1, the wireless power transmitting unit determines that the load change detection is not possible and thus performs the determination of the wireless power receiving unit to be communicated with regardless of the load change detection.

A reference of the category information to determine whether the load change detection can be performed by the wireless power transmitting unit may be preset by the wireless power transmitting unit or received from the wireless power receiving unit through the communication.

Meanwhile, although it has been described that the wireless power receiving unit to be communicated with is determined based on the category of the wireless power receiving unit, Table 6 below may be used as the reference to determine the wireless power receiving unit to be communicated with.

Specifically, when the wireless power transmitting unit receives the PTU searching signal of the wireless power receiving unit, the wireless power transmitting unit detects load detection indication bit information of the wireless power receiving unit included in the searching signal. The load detection indication bit information may have a value of three bits, such as "000", "001", "010", "011", "100", and "101", according to a type of the wireless power receiving unit.

TABLE 6

| load detection indication bit (bit) | Type of wireless power receiving unit |
|---|---|
| 000 | Device of which load change cannot be detected |
| 001 | Wireless power receiving unit of category 1 (for example, Bluetooth headset) |
| 010 | Wireless power receiving unit of category 2 (for example, feature phone) |
| 011 | Wireless power receiving unit of category 3 (for example, smart phone) |
| 100 | Wireless power receiving unit of category 4 (for example, tablet) |
| 101 | Wireless power receiving unit of category 5 (for example, laptop) |

For example, when the load detection indication bit corresponds to "000", it refers to a device of which the load change cannot be detected regardless of the category of the wireless power receiver. Accordingly, even in a case of a smart phone having Category information 3 of the wireless power receiving unit, when the load detection indication bit included in the searching signal corresponds to "000", the device is determined as not being subject to be communicated with and the communication is disconnected.

Various embodiments of the present invention provide a wireless power transmitting unit and a control method thereof which determine a wireless power receiving unit forming a cross-connection and exclude the determined wireless power receiving unit. Further, various embodiments of the present invention provide a wireless power receiving unit and a control method thereof in which a wireless power transmitting unit determines a wireless power receiving unit forming a cross-connection.

Accordingly, it is possible to prevent the wasted power of the wireless power transmitting unit due to cross-connection. Further, a condition in which over power is applied to wireless power receiving units due to cross-connection can be prevented.

While the present invention has been shown and described with reference to certain embodiments thereof, it will be understood by those skilled in the art that various changes in form and details may be made therein without departing from the spirit and scope of the present invention as defined by the appended claims. Therefore, various modified implementations can be made without departing from the substance of the present invention claimed in the appended claims, and the modified implementations should not be construed separately from the technical idea or concept of the present invention.

What is claimed is:

1. A method for controlling a wireless power transmitter, the method comprising:
    applying a detection power for detecting a change in a load impedance of the wireless power transmitter;
    detecting the change in the load impedance of the wireless power transmitter;
    receiving, from a wireless power receiver, a first signal within a preset time period after detecting the change, wherein the first signal includes a field for a load impedance detection;
    determining whether the detected change corresponds to the field of the first signal;
    determining whether a reception intensity of the first signal is greater than a threshold; and
    based on a determination that the detected change corresponds to the field of the first signal and the reception intensity of the first signal is greater than the threshold, transmitting, to the wireless power receiver, a second signal to form a communication connection with the wireless power receiver.

2. The method of claim 1, wherein the second signal is arranged such that the wireless power receiver performs a joining operation for joining a wireless power network corresponding to the wireless power transmitter.

3. The method of claim 1, wherein the determining whether a reception intensity of the first signal is greater than a threshold comprises:
    identifying a minimum reception intensity;
    setting a determination range based on the minimum reception intensity; and
    determining whether the reception intensity of the first signal is within the determination range.

4. The method of claim 3, wherein the identifying a minimum reception intensity comprises:
    identifying the minimum reception intensity from among first signals received from a plurality of wireless power receivers.

5. The method of claim 1, further comprising:
    based on a determination that the reception intensity of the first signal is not greater than the threshold, determining that the wireless power transmitter forms a cross-connection with the wireless power receiver.

6. A wireless power transmitter for transmitting power to a wireless power receiver, the wireless power transmitter comprising:
    a resonator;
    a controller configured to control to output a detection power through the resonator for detecting a change in a load impedance of the wireless power transmitter, and detect the change in the load impedance of the wireless power transmitter; and
    a wireless communication unit configured to receive a first signal within a preset time period after detecting the change, wherein the first signal includes a field for a load impedance detection,
    wherein the controller is further configured to:
        determine whether the detected change corresponds to the field of the first signal,
        determine whether a reception intensity of the first signal is greater than a threshold, and based on a determination that the detected change corresponds to the field of the first signal and the reception intensity of the first signal is greater than the threshold, transmit, to the wireless power receiver, a second signal to form a communication connection with the wireless power receiver by using the wireless communication unit.

7. The wireless power transmitter of claim 6, wherein, the second signal is arranged such that the wireless power receiver performs a joining operation for joining a wireless power network corresponding to the wireless power transmitter.

8. The wireless power transmitter of claim 6, wherein the controller is further configured to:
   identify a minimum reception intensity;
   set a determination range based on the minimum reception intensity; and
   determine whether the reception intensity of the first signal is within the determination range.

9. The wireless power transmitter of claim 8, wherein the controller is further configured to:
   identify the minimum reception intensity from among first signals received from a plurality of wireless power receivers.

10. The wireless power transmitter of claim 6, wherein the controller is further configured to determine that the wireless power transmitter forms a cross-connection with the wireless power receiver, based on a determination that the reception intensity of the first signal is not greater than the threshold.

* * * * *